(12) United States Patent
Xu et al.

(10) Patent No.: US 10,264,290 B2
(45) Date of Patent: Apr. 16, 2019

(54) HASH-BASED BLOCK MATCHING IN VIDEO AND IMAGE CODING

(71) Applicant: Microsoft Technology Licensing, LLC, Redmond, WA (US)

(72) Inventors: Jizheng Xu, Beijing (CN); Weijia Zhu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/024,812

(22) PCT Filed: Oct. 25, 2013

(86) PCT No.: PCT/CN2013/085937
§ 371 (c)(1),
(2) Date: Mar. 24, 2016

(87) PCT Pub. No.: WO2015/058395
PCT Pub. Date: Apr. 30, 2015

(65) Prior Publication Data
US 2016/0234530 A1 Aug. 11, 2016

(51) Int. Cl.
*H04N 19/169* (2014.01)
*H04N 19/50* (2014.01)
(Continued)

(52) U.S. Cl.
CPC ........... *H04N 19/94* (2014.11); *H04N 19/147* (2014.11); *H04N 19/176* (2014.11);
(Continued)

(58) Field of Classification Search
CPC .... H04N 19/593; H04N 19/136; H04N 19/46; H04N 19/176; H04N 19/105;
(Continued)

(56) References Cited

U.S. PATENT DOCUMENTS 2,239,538 A 4/1941 Richter
2,718,173 A 9/1955 Hacman et al.
(Continued)

FOREIGN PATENT DOCUMENTS

CN 1857001 11/2006
CN 1874487 12/2006
(Continued)

OTHER PUBLICATIONS

Communication pursuant to Article 94(3) EPC dated Aug. 25, 2016, from European Patent Application No. 13895864.0, 7 pp.
(Continued)

*Primary Examiner* — Sathyanaraya V Perungavoor
*Assistant Examiner* — Philip P. Dang
(74) *Attorney, Agent, or Firm* — Klarquist Sparkman, LLP

(57) ABSTRACT

Innovations in hash-based block matching facilitate block copy ("BC") prediction that is more effective in terms of rate-distortion performance and/or computational efficiency of encoding. For example, some of the innovations relate to encoding that uses hash-based block matching during block vector ("By") estimation. Other innovations relate to data structures that organize candidate blocks for hash-based block matching. Still other innovations relate to hierarchical hash-based block matching.

20 Claims, 17 Drawing Sheets

(51) Int. Cl.
| | |
|---|---|
| *H04N 19/94* | (2014.01) |
| *H04N 19/503* | (2014.01) |
| *H04N 19/593* | (2014.01) |
| *H04N 19/147* | (2014.01) |
| *H04N 19/176* | (2014.01) |
| *H04N 19/52* | (2014.01) |
| *H04N 19/70* | (2014.01) |

(52) U.S. Cl.
CPC ........... *H04N 19/503* (2014.11); *H04N 19/52* (2014.11); *H04N 19/593* (2014.11); *H04N 19/70* (2014.11)

(58) Field of Classification Search
CPC ...... H04N 19/70; H04N 19/97; H04N 1/4486; H04N 1/4466; H04N 19/44
See application file for complete search history.

(56) References Cited

U.S. PATENT DOCUMENTS

| | | | |
|---|---|---|---|
| 3,059,528 A | 10/1962 | Allan | |
| 3,142,236 A | 7/1964 | Siegmund et al. | |
| 3,642,351 A | 2/1972 | Tronnier et al. | |
| 4,918,583 A | 4/1990 | Kudo et al. | |
| 5,016,980 A | 5/1991 | Waldron | |
| 5,610,841 A | 3/1997 | Tanaka et al. | |
| 5,613,004 A * | 3/1997 | Cooperman | G06T 1/0021 380/28 |
| 5,687,236 A * | 11/1997 | Moskowitz | G06T 1/0021 380/28 |
| 5,689,365 A | 11/1997 | Takahashi | |
| 5,774,271 A | 6/1998 | Lagerway et al. | |
| 5,850,312 A | 12/1998 | Kato et al. | |
| 6,332,092 B1 | 12/2001 | Deckert et al. | |
| 6,487,440 B2 | 11/2002 | Deckert et al. | |
| 6,618,197 B1 | 9/2003 | Hayakawa | |
| 6,879,266 B1 | 4/2005 | Dye et al. | |
| 6,904,110 B2 | 6/2005 | Trans et al. | |
| 6,983,020 B2 * | 1/2006 | Christiansen | G06T 9/004 375/240.16 |
| 6,995,918 B2 | 2/2006 | Terasawa et al. | |
| 7,046,460 B2 | 5/2006 | Nozawa | |
| 7,206,346 B2 | 4/2007 | Shimizu et al. | |
| 7,216,232 B1 * | 5/2007 | Cox | G06T 1/0021 713/176 |
| 7,239,454 B2 | 7/2007 | Kobayashi et al. | |
| 7,349,583 B2 | 3/2008 | Kumar et al. | |
| 7,379,499 B2 | 5/2008 | Dahlhoff et al. | |
| 7,421,128 B2 | 9/2008 | Venkatesan et al. | |
| 7,430,670 B1 * | 9/2008 | Horning | G06F 21/14 713/190 |
| 7,466,418 B2 | 12/2008 | Nilson et al. | |
| 7,609,763 B2 | 10/2009 | Mukerjee et al. | |
| 7,613,364 B2 | 11/2009 | Kang et al. | |
| 7,636,824 B1 | 12/2009 | Tormasov | |
| 7,672,005 B1 | 3/2010 | Hobbs et al. | |
| 7,702,127 B2 * | 4/2010 | Mihcak | G06T 1/0028 382/100 |
| 7,706,682 B2 | 4/2010 | Keller et al. | |
| 7,733,497 B2 | 6/2010 | Yun et al. | |
| 7,747,584 B1 * | 6/2010 | Jernigan, IV | G06F 17/30156 707/692 |
| 7,761,712 B2 * | 7/2010 | Moskowitz | G06T 1/0021 713/176 |
| 7,868,792 B2 | 1/2011 | Artan et al. | |
| 7,870,393 B2 * | 1/2011 | Moskowitz | G06T 1/0021 713/176 |
| 7,873,786 B1 | 1/2011 | Singh et al. | |
| 7,912,244 B2 * | 3/2011 | Mihcak | G06T 1/0028 382/100 |
| 7,949,186 B2 * | 5/2011 | Grauman | G06K 9/4671 382/159 |
| 7,986,844 B2 | 7/2011 | Diamant et al. | |
| 8,003,186 B2 | 8/2011 | Ishizaki et al. | |
| 8,005,142 B2 | 8/2011 | Kim et al. | |
| 8,041,677 B2 * | 10/2011 | Sumner | G06F 11/1453 707/640 |
| 8,086,052 B2 * | 12/2011 | Toth | H04N 19/52 382/232 |
| 8,099,415 B2 * | 1/2012 | Luo | G06F 17/30569 707/736 |
| 8,099,601 B2 * | 1/2012 | Serret-Avila | G06T 1/0071 713/170 |
| 8,107,527 B1 | 1/2012 | Hobbs et al. | |
| 8,197,397 B2 | 6/2012 | Rovegno | |
| 8,213,503 B2 | 7/2012 | Tu et al. | |
| 8,264,489 B2 | 9/2012 | Saint-Hilaire et al. | |
| 8,284,484 B2 | 10/2012 | Hoult et al. | |
| 8,295,617 B2 | 10/2012 | Collins | |
| 8,411,750 B2 | 4/2013 | Dane | |
| 8,417,039 B2 | 4/2013 | Albu et al. | |
| 8,442,942 B2 | 5/2013 | Leppard | |
| 8,515,123 B2 | 8/2013 | Thorwirth | |
| 8,619,857 B2 | 12/2013 | Zhao et al. | |
| 8,644,620 B1 | 2/2014 | Lam | |
| 8,681,870 B2 | 3/2014 | Takada | |
| 8,787,460 B1 | 7/2014 | Hobbs | |
| 8,897,512 B1 | 11/2014 | Bozinovic et al. | |
| 9,167,020 B2 | 10/2015 | Abdo et al. | |
| 9,223,534 B1 | 12/2015 | Eilam | |
| 9,225,979 B1 | 12/2015 | Jia et al. | |
| 9,235,313 B2 | 1/2016 | Wu et al. | |
| 9,277,237 B2 | 3/2016 | Abiezzi et al. | |
| 9,286,862 B2 | 3/2016 | Peacock | |
| 9,332,270 B2 | 5/2016 | Ju | |
| 2001/0001614 A1 | 5/2001 | Boice et al. | |
| 2004/0131014 A1 * | 7/2004 | Thompson, III | H04H 60/06 370/230 |
| 2004/0133548 A1 | 7/2004 | Fielding et al. | |
| 2004/0174570 A1 | 9/2004 | Plunkett et al. | |
| 2005/0166040 A1 * | 7/2005 | Walmsley | B41J 2/04505 713/150 |
| 2006/0062303 A1 | 3/2006 | Xu | |
| 2006/0132931 A1 | 6/2006 | Epple et al. | |
| 2006/0224594 A1 * | 10/2006 | Goyal | G06F 17/30008 |
| 2007/0036226 A1 | 2/2007 | Kim et al. | |
| 2007/0041066 A1 | 2/2007 | Yasuda et al. | |
| 2007/0053662 A1 | 3/2007 | Tobita et al. | |
| 2007/0116110 A1 | 5/2007 | Diamant et al. | |
| 2007/0199011 A1 | 8/2007 | Zhang et al. | |
| 2008/0104652 A1 | 5/2008 | Swenson et al. | |
| 2008/0212687 A1 | 9/2008 | Liu | |
| 2009/0022374 A1 | 1/2009 | Boult | |
| 2009/0115909 A1 | 5/2009 | Walls et al. | |
| 2010/0057750 A1 | 3/2010 | Aasted et al. | |
| 2010/0119170 A1 | 5/2010 | Sengamedu et al. | |
| 2010/0166073 A1 | 7/2010 | Schmit et al. | |
| 2010/0177893 A1 | 7/2010 | Jeon et al. | |
| 2010/0268836 A1 * | 10/2010 | Jabri | H04L 47/38 709/231 |
| 2010/0293248 A1 | 11/2010 | Kamay et al. | |
| 2011/0007801 A1 | 1/2011 | Andersson et al. | |
| 2011/0010396 A1 * | 1/2011 | Zhou | G06F 17/30958 707/798 |
| 2011/0128810 A1 | 6/2011 | Sato | |
| 2011/0225114 A1 * | 9/2011 | Gotthardt | G06F 21/6245 706/50 |
| 2011/0243234 A1 | 10/2011 | Kondo et al. | |
| 2011/0299785 A1 | 12/2011 | Albu et al. | |
| 2011/0311042 A1 * | 12/2011 | Cheddad | G06F 21/602 380/28 |
| 2012/0057631 A1 | 3/2012 | Le Leannec | |
| 2012/0170653 A1 | 7/2012 | Panusopone et al. | |
| 2012/0245688 A1 | 9/2012 | Vanaclocha | |
| 2012/0294523 A1 | 11/2012 | Abdo et al. | |
| 2013/0013618 A1 * | 1/2013 | Heller | G06F 17/3015 707/747 |
| 2013/0022113 A1 | 1/2013 | Chen et al. | |
| 2013/0034158 A1 | 2/2013 | Kirchhoffer et al. | |
| 2013/0036289 A1 * | 2/2013 | Welnicki | G06F 3/0608 711/173 |

(56) References Cited

U.S. PATENT DOCUMENTS

| | | | |
|---|---|---|---|
| 2013/0057646 | A1 | 3/2013 | Chen et al. |
| 2013/0057666 | A1 | 3/2013 | Fujii |
| 2013/0067344 | A1 | 3/2013 | Ungureanu et al. |
| 2013/0078592 | A1 | 3/2013 | McCarthy |
| 2013/0114704 | A1 | 5/2013 | Chen et al. |
| 2013/0142447 | A1 | 6/2013 | Park et al. |
| 2013/0147974 | A1 | 6/2013 | Ju et al. |
| 2013/0148721 | A1* | 6/2013 | Chen ............ G09G 5/001 375/240.12 |
| 2013/0176560 | A1 | 7/2013 | Wax et al. |
| 2013/0208810 | A1 | 8/2013 | Shen et al. |
| 2013/0243089 | A1* | 9/2013 | Lim ............ H04N 19/176 375/240.12 |
| 2013/0258052 | A1 | 10/2013 | Li et al. |
| 2013/0266073 | A1 | 10/2013 | MacInnis et al. |
| 2013/0266078 | A1* | 10/2013 | Deligiannis ........ H04N 19/159 375/240.25 |
| 2013/0268621 | A1 | 10/2013 | Mese et al. |
| 2013/0272394 | A1* | 10/2013 | Brockmann ............ G06T 9/00 375/240.12 |
| 2013/0279564 | A1 | 10/2013 | Wang |
| 2013/0279577 | A1 | 10/2013 | Schwarz et al. |
| 2013/0335527 | A1 | 12/2013 | Takahashi et al. |
| 2014/0002603 | A1 | 1/2014 | Takahashi et al. |
| 2014/0003506 | A1 | 1/2014 | Wang et al. |
| 2014/0010294 | A1 | 1/2014 | Ye et al. |
| 2014/0016698 | A1 | 1/2014 | Joshi et al. |
| 2014/0029668 | A1 | 1/2014 | Lim et al. |
| 2014/0050413 | A1 | 2/2014 | Sato |
| 2014/0064360 | A1 | 3/2014 | Rapaka et al. |
| 2014/0092994 | A1 | 4/2014 | Wang |
| 2014/0321553 | A1 | 10/2014 | Clark |
| 2014/0369413 | A1 | 12/2014 | Clark |
| 2014/0369421 | A1 | 12/2014 | Zhu et al. |
| 2015/0054946 | A1 | 2/2015 | Zhang |
| 2015/0063451 | A1 | 3/2015 | Zhu et al. |
| 2015/0092840 | A1 | 4/2015 | Mochizuki et al. |
| 2016/0234530 | A1 | 8/2016 | Xu et al. |
| 2016/0241876 | A1 | 8/2016 | Xu et al. |
| 2016/0269732 | A1 | 9/2016 | Li et al. |
| 2016/0277733 | A1 | 9/2016 | Li et al. |
| 2016/0277761 | A1 | 9/2016 | Li et al. |
| 2018/0063540 | A1 | 3/2018 | Zhu et al. |

FOREIGN PATENT DOCUMENTS

| | | |
|---|---|---|
| CN | 1874519 | 12/2006 |
| CN | 101283578 | 10/2008 |
| CN | 101710324 | 5/2010 |
| CN | 101866366 | 10/2010 |
| CN | 102576411 | 7/2012 |
| CN | 103281538 | 9/2013 |
| CN | 103430549 | 12/2013 |
| CN | 103841426 | 6/2014 |
| CN | 104574440 | 4/2015 |
| EP | 1349395 | 10/2003 |
| EP | 2996360 | 3/2016 |
| GB | 2375673 | 11/2002 |
| GB | 2460844 | 12/2009 |
| JP | H11-66301 | 3/1999 |
| WO | WO 00/60874 | 10/2000 |
| WO | WO 02/093934 | 11/2002 |
| WO | WO 2010/085899 | 8/2010 |
| WO | WO 2010/086548 | 8/2010 |
| WO | WO 2011/153005 | 12/2011 |
| WO | WO 2013/068433 | 5/2013 |
| WO | WO 2013/072484 | 5/2013 |
| WO | WO 2013/103376 | 7/2013 |
| WO | WO 2013/159038 | 10/2013 |
| WO | WO 2015/131325 | 9/2015 |
| WO | WO 2015/139165 | 9/2015 |
| WO | WO 2016/018422 | 2/2016 |

OTHER PUBLICATIONS

Flynn et al., "High Efficiency Video Coding (HEVC) Range Extensions text specification: Draft 6," JCTVC-P1005_v1, 355 pp. (Jan. 2014).

Gaikar, "Techinline Remote Desktop Software: Access Your Computers Remotely," *Tricks Machine*, 6 pp. (Jan. 2012).

International Preliminary Report on Patentability dated May 6, 2016, from International Patent Application No. PCT/CN2013/085937, 7 pp.

Kwon et al., "AHG5: Fast encoding using early skipping of Intra block copy (IntraBC) search," JCTVC-O0245, 9 pp. (Oct. 2013).

Li et al., "Description of screen content coding technology proposal by Microsoft," JCTVC-Q0035, 27 pp. (Mar. 2014).

Li et al., "Hash-based intraBC search," JCTVC-Q0252, 2 pp. (Mar. 2014).

Li et al., "Hash-based motion search," JCTVC-Q0245, 5 pp. (Mar. 2014).

Li et al., "Low complexity encoders for JCTVC-Q0035," JCTVC-Q0052, 4 pp. (Mar. 2014).

Praveen et al., "Analysis and Approximation of SAO Estimation for CTU-Level HEVC Encoder," *Proc. Of Visual Communications and Image Processing*, 5 pp. (Nov. 2013).

Rane, "Hash-Aided Motion Estimation and Rate Control for Distributed Video Coding," EE392J Project Report, 10 pp. (Dec. 2004).

Robert et al., "Improving Intra mode coding in H.264/AVC through block oriented transforms," IEEE 8th Workshop on Multimedia Signal Processing, 5 pp. (Oct. 2006).

Sangi et al., "Global Motion Estimation Using Block Matching with Uncertainty Analysis," *Signal Processing Conference*, pp. 1823-1827 (Sep. 2007).

Sun et al., "Motion-Embedded Residual Error for Packet Loss Recovery of Video Transmission and Encryption," *Visual Communications and Image Processing*, vol. 6077, 14 pp. (Jan. 2006).

Supplementary European Search Report dated Jul. 5, 2016, from European Patent Application No. 13895864.0, 4 pp.

Wu et al., "Linear Hashtable Method Predicted Hexagonal Search Algorithm with Spatial Related Criterion," *Lecture Notes in Computer Science*, pp. 1208-1217 (Jun. 2005).

Zhu et al., "2-D Dictionary Based Video Coding for Screen Contents," *Data Compression Conf.*, pp. 43-52 (Mar. 2014).

Zhu et al., "Screen content coding using 2-D dictionary mode," JCTVC-O0355, 4 pp. (Oct. 2013).

Ascenso et al., "Adaptive Hash-Based Side Information Exploitation for Efficient Wyner-Ziv Video Coding," *IEEE Int'l Conf. on Image Processing*, 4 pp. (Sep. 2007).

Bankoski et al., "VP8 Data Format and Decoding Guide," RFC 6386, 304 pp. (Nov. 2011).

Flynn et al., "High Efficiency Video Coding (HEVC) Range Extensions text specification: Draft 4," JCTVC-N1005, 322 pp. (Apr. 2013).

International Search Report and Written Opinion dated Jun. 10, 2014, from International Patent Application No. PCT/CN2013/085937, 12 pp.

ISO/IEC 11172-2, "Information technology—Coding of moving pictures and associated audio for digital storage media at up to about 1,5 Mbit/s—Part 2: Video," 122 pp. (Aug. 1993).

ISO/IEC 14496-2, "Information Technology—Coding of Audio-Visual Objects: Visual," ISO/IEC JTC1/SC29/WG11 N2202, 327 pp. (Mar. 1998).

ITU-T Recommendation H.261, "Video Codec for Audiovisual Services at p x 64 kbits," 29 pp. (Mar. 1993).

ITU-T Recommendation H.262, "Generic Coding of Moving Pictures and Associated Audio Information: Video," 218 pp. (Jul. 1995).

ITU-T Recommendation H.263, "Video coding for low bit rate communication," 167 pp. (Feb. 1998).

ITU-T Recommendation H.264, "Advanced video coding for generic audiovisual services," 680 pp. (Jan. 2012).

ITU-T Recommendation H.265, "High efficiency video coding," 317 pp. (Apr. 2013).

(56) References Cited

OTHER PUBLICATIONS

Shah et al., "HD Resolution Intra Prediction Architecture for H.264 Decoder," *IEEE Int'l Conf. on VLSI Design*, pp. 107-112 (Jan. 2012).

SMPTE Standard, "VC-1 Compressed Video Bitstream Format and Decoding Process," SMPTE 421M-2006, 493 pp. (Feb. 2006).

Yang et al., "MyFinder: Near-Duplicate Detection for Large Image Collections," *ACM Int'l Conf. on Multimedia*, pp. 1013-1014 (Oct. 2009).

Zhu et al., "Screen content coding using 2-D dictionary mode," JCTVC-O0357, 4 pp. (Oct. 2013).

Chen et al., "Description of Screen Content Coding Technology Proposal by Qualcomm," JCTVC-Q0031, 18 pp. (Mar. 2014).

Chum, et al., "Scalable Near Identical Image and Shot Detection", In Proceedings of International Conference on Image and Video Retrieval, Jul. 9, 2007, pp. 549-556.

Communication pursuant to Article 94(3) EPC dated Apr. 5, 2017, from European Patent Application No. 13895864.0, 4, pp.

Communication pursuant to Article 94(3) EPC dated Jan. 10, 2018, from European Patent Application No. 13895864.0, 4 pp.

Gargi, et al., "Performance Characterization of Video-Shot-Change Detection Methods", In IEEE Transactions on Circuits and Systems for Video Technology, vol. 10, Issue 1, Feb. 1, 2000, 13 Pages.

Li et al., "Adaptive Motion Vector Resolution for Screen Content," JCTVC-R0106 rl, ITU-T SG16 WP 3 and ISO/IEC JTC1/SC29/WG11, 18th Meeting, 16 pp. (Jun. 2014).

Li et al., "An HEVC-Based Screen Content Coding Scheme," JCTVC ITU-T SG16 WP3 and ISO/IEC JTC1/SC29/WG11 17th Meeting, 13 pp. (Mar. 27, 2014).

Li et al., "Screen Content Coding Using Dictionary Based Mode," JCTVC-P0214_rl, 5 pp. (Jan. 2014).

Monga et al, "Perceptual Image Hashing Via Feature Points: Performance Evaluation and Tradeoffs," IEEE Transactions Image Processing, pp. 3452-3465 (Nov. 2006).

Notice on the First Office Action dated Jun. 2, 2017, from Chinese Patent Application No. 201380080482.X, 13 pp.

Notice on the Second Office Action dated Jan. 4, 2018, from Chinese Patent Application No. 201380080482.X, 7 pp.

Ribas-Corbera et al., "Optimizing Motion-Vector Accuracy in Block-Based Video Coding," *IEEE Trans. On Circuits and Systems for Video Technology*, vol. 11, No. 4, pp. 497-511 (Apr. 2001).

Tagliasacchi et al., "Hash-Based Motion Modeling in Wyner-Ziv Video Coding," *IEEE Int'l Conf. on Acoustics, Speech, and Signal Processing*, 4 pp. (Apr. 2007).

Wei et al., "An Efficient Intra-Mode Selection Algorithm for H.264 Based on Edge Classification and Rate-Distortion Estimation," Signal Processing: Image Communication vol. 23, No. 9, pp. 699-710, Oct. 1, 2008 (retrieved Aug. 22, 2008).

Wikipedia, "Locality-sensitive Hashing" 7 pp. (document marked: "last edited on Feb. 6, 2018").

Yu et al., "New Intra Prediction Using Intra-Macroblock Motion Compensation," JVT-C151, 10 pp. (May 2002).

Zhou et al., "Motion Vector Resolution Control for Screen Content Coding," JCTVC-P0277, 6 pp. (Jan. 2014).

Brasnett et al., "Comments & Results on MPEG-7 Image Signature," MPEG2008/M15863, 4 pp. (Oct. 2008).

Communication pursuant to Article 94(3) EPC dated May 24, 2018, from European Patent Application No. 13895864.0, 5 pp.

Communication pursuant to Article 94(3) EPC dated Feb. 8, 2017, from European Patent Application No. 14884278.4, 5 pp.

Communication pursuant to Article 94(3) dated Jul. 6, 2017, from European Patent Application No. 14895767.3, 8 pp.

Communication pursuant to Article 94(3) dated Jun. 14, 2017, from European Patent Application No. 14885049.8, 7 pp.

Communication pursuant to Article 94(3) EPC dated Mar. 15, 2018, from European Patent Application No. 14895767.3, 5 pp.

Communication pursuant to Article 94(3) EPC dated Apr. 4, 2018, from European Patent Application No. 13896175.0, 6 pp.

Communication pursuant to Rule 164(1) EPC dated Feb. 16, 2017, from European Patent Application No. 14885049.8, 7 pp.

Communication pursuant to Article 94(3) EPC dated Feb. 16, 2018, from European Patent Application No. 14903205.4, 11 pp.

Extended European Search Report dated Aug. 21, 2018, from European Patent Application No. 18176302.0, 5 pp.

Examination Report dated Sep. 29, 2016, from European Patent Application No. 13896175.0, 8 pp.

Final Office Action dated Apr. 6, 2018, from U.S. Appl. No. 15/024,812, 123 pp.

Final Office Action dated Apr. 9, 2018, from U.S. Appl. No. 15/321,536, 58 pp.

International Preliminary Report on Patentability dated May 6, 2016, from International Patent Application No. PCT/CN2013/085939, 6 pp.

International Preliminary Report on Patentability dated Sep. 15, 2016, from International Patent Application No. PCT/CN2014/072834, 6 pp.

International Preliminary Report on Patentability dated Sep. 15, 2016, from International Patent Application No. PCT/CN2014/072827, 6 pp.

International Preliminary Report on Patentability dated Jan. 5, 2017, from International Patent Application No. PCT/CN2014/080481, 7 pp.

International Search Report and Written Opinion dated Jul. 30, 2014, from International Patent Application No. PCT/CN2013/085939, 12 pp.

International Search Report and Written Opinion dated Dec. 10, 2014, from International Patent Application No. PCT/CN2014/072827, 12 pp.

International Search Report and Written Opinion dated Dec. 3, 2014, from International Patent Application No. PCT/CN2014/072834, 13 pp.

International Search Report and Written Opinion dated Mar. 2, 2015, from International Patent Application No. PCT/CN2014/080481, 13 pp.

International Search Report and Written Opinion dated Jul. 1, 2015, from International Patent Application No. PCT/CN2014/087869, 12 pp.

International Search Report and Written Opinion dated May 3, 2018, from International Patent Application No. PCT/US2017/063164, 30 pp.

International Search Report and Written Opinion dated Jan. 24, 2018, from International Patent Application No. PCT/US2017/057066, 12 pp.

Invitation pursuant to Article 94(3) and Rule 71(1) EPC dated May 31, 2017, from European Patent Application No. 14884278.4, 3 pp.

Invitation pursuant to Article 94(3) and Rule 71(1) EPC dated Oct. 26, 2017, from European Patent Application No. 14885049.8, 5 pp.

Li et al., "A Unified Framework of Hash-based Matching for Screen Content Coding," *IEEE VCIP*, pp. 530-533 (Dec. 2014).

Li et al., "RDPCM operation unification and cleanup," JCTVC-O0185, pp. 1-6 (Oct. 2013).

Notice on the First Office Action dated Jan. 17, 2018, from Chinese Patent Application No. 201480030627.X, 14 pp.

Notice on the First Office Action dated Feb. 5, 2018, from Chinese Patent Application No. 201480029780.0, 14 pp.

Notice on the First Office Action dated Mar. 20, 2018, from Chinese Patent Application No. 201380080483.4, 12 pp.

Notice on the First Office Action dated May 3, 2018, from Chinese Patent Application No. 201480048046.9, 12 pp.

Notice on the Second Office Action dated Sep. 29, 2018, from Chinese Patent Application No. 201480030627.X, 13 pp.

Notice on Grant of Patent dated Jun. 5, 2018, from Chinese Patent Application No. 201380080482.X, 4 pp.

Office Action dated May 1, 2018, from U.S. Appl. No. 15/253,568, 7 pp.

Pauleve et al., "Locality sensitive hashing: A comparison of hash function types and querying mechanisms," *Pattern Recognition Letters*, vol. 31, No. 11, pp. 1348-1358 (Aug. 2010).

Rapaka et al., "Improved intra block copy and motion search methods for screen content coding," *Visual Communications and Image Procsesing*, vol. 9599, pp. (Sep. 2015).

(56) References Cited

OTHER PUBLICATIONS

Riguer et al., "Real-Time Depth of Field Simulation," *ShaderX2: Shader Programming Tips and Tricks with DirectX 9*, pp. 1-30 (Jan. 2003).
Supplementary European Search Report dated Sep. 14, 2016, from European Patent Application No. 13896175.0, 6 pp.
Supplementary European Search Report dated Jan. 31, 2017, from European Patent Application No. 14884278.4, 4 pp.
Supplementary European Search Report dated May 18, 2017, from European Patent Application No. 14885049.8, 6 pp.
Supplementary European Search Report dated Jun. 14, 2017, from European Patent Application No. 14895767.3, 5 pp.
Supplementary Partial European Search Report dated Sep. 27, 2017, from European Patent Application No. 14903205.4, 14 pp.
Supplementary European Search Report dated Jan. 29, 2018, from European Patent Application No. 14903205.4, 9 pp.
Wikipedia, "Locality-sensitive Hashing" 6 pp. (document marked: "last modified on Apr. 18, 2013").

\* cited by examiner software 180 implementing one or more innovations for hash-based block matching and/or hash-based block reconstruction

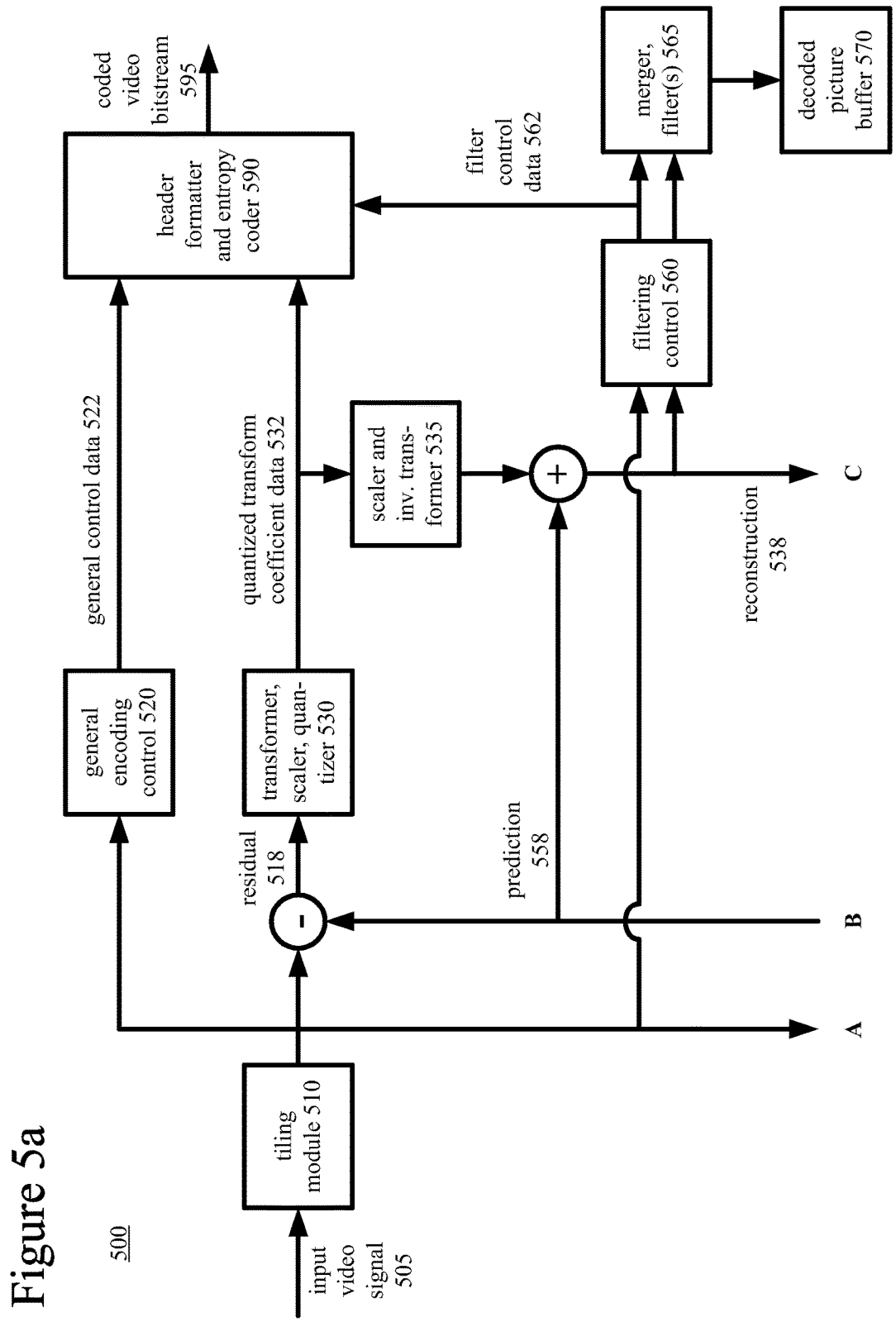

500 block vector (740) for current block (730) of current frame (710), indicating a displacement to a matching block (750) in the current frame (710)

block vectors (841, 842, 843, 844) indicating displacements to candidate blocks for current block (830) of current frame (810)

900

1920 width 1080 height reconstructed content 912 current block 930 current frame 910 number of candidate 64x64 blocks for block vector estimation
for current 64x64 block at position (896, 576):

(576 − 64 + 1) x (1920 − 64 + 1) + (896 − 64 + 1) = 953,474

Figure 10    1000            $h(B_{current}) = h_3$ $h_0$ :   B(1266, 263), B(1357, 365), B(1429, 401), B(502, 464), . . .

$h_1$ :   B(1704, 154), B(1709, 177), B(1158, 242)

$h_2$ :   B(1321, 49), B(145, 182), B(599, 490), B(1668, 511), . . .

$h_3$ :   B(569, 73), B(1293, 102), B(401, 290), B(455, 306), . . .

$h_4$ :   B(1119, 46)

$h_5$ :   B(1381, 11), B(1676, 53), B(38, 119), B(1633, 184), . . .

$h_6$ :   B(979, 85), B(1013, 177), B(575, 470), B(900, 477), . . .

· 
· 
·

$h_{n-1}$ :   B(794, 14), B(1479, 17), B(19, 317), B(1338, 374), . . .

(example of 1110)

Figure 12a  1200

$h_0$ :  entry(0, 0), entry(0, 1), entry(0, 2), entry(0, 3), ...

$h_1$ :  entry(1, 0), entry(1, 1), entry(1, 2), entry(1, 3), ...

$h_2$ :

$h_3$ :  entry(3, 0), entry(3, 1), entry(3, 2), entry(3, 3)

$h_4$ :  entry(4, 0), entry(4, 1), entry(4, 2), entry(4, 3), ...

$h_5$ :  entry(5, 0), entry(5, 1), entry(5, 2), entry(5, 3), ...

$h_6$ :  entry(6, 0), entry(6, 1)

.
.
.

$h_{n-1}$ :  entry(n-1, 0), entry(n-1, 1), entry(n-1, 2), entry(n-1, 3), ...

Figure 12b  1210

*entry($h_i$, x)* :  address of *B*

Figure 12c  1220

*entry($h_i$, x)* :  address of *B* and hash value $h'(B)$ from $2^{nd}$ hash function $h'()$

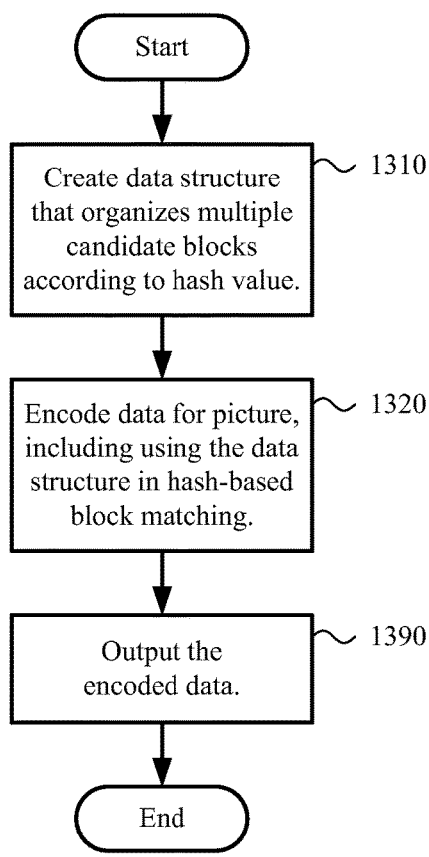
Figure 13a 1300
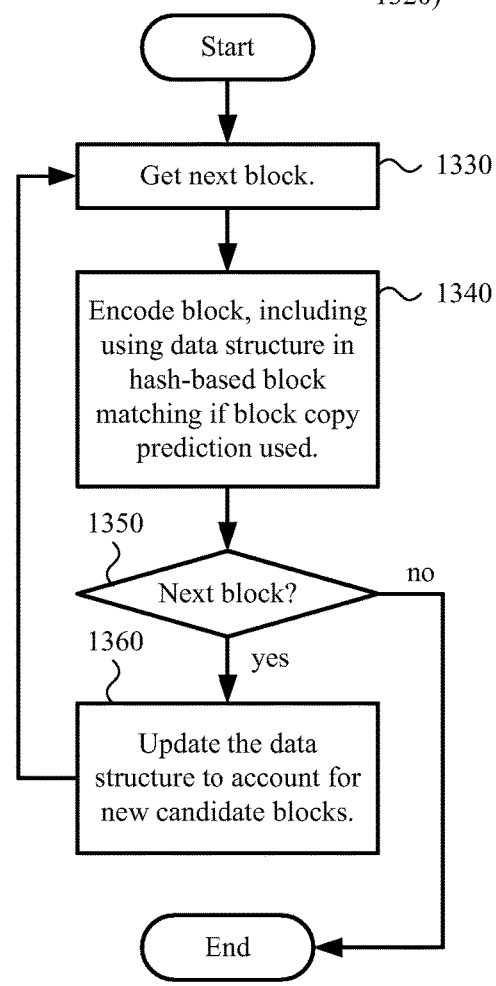
Figure 13b 1321 (example of 1320)

Figure 14a  1400   $h(B_{current}) = h_2$ $h_0$:    $h'_0$ list, $h'_1$ list, $h'_2$ list, $h'_3$ list, ...

$h_1$:    $h'_0$ list, $h'_1$ list, $h'_2$ list, $h'_3$ list, ...

$\boxed{h_2: \quad h'_0 \text{ list}, h'_1 \text{ list}, h'_2 \text{ list}, h'_3 \text{ list}, \ldots}$ $h_3$:    $h'_0$ list, $h'_1$ list, $h'_2$ list, $h'_3$ list, ...

·
   ·
   ·

$h_{n1-1}$:    $h'_0$ list, $h'_1$ list, $h'_2$ list, $h'_3$ list, ...

Figure 14b  1410   $h'(B_{current}) = h'_0$ $\boxed{h'_0: \quad entry(0, 0), entry(0, 1), entry(0, 2), entry(0, 3), \ldots}$ $h'_1$:    $entry(1, 0), entry(1, 1), entry(1, 2), entry(1, 3), \ldots$ $h'_2$:

$h'_3$:    $entry(3, 0), entry(3, 1), entry(3, 2), entry(3, 3)$

·
   ·
   ·

$h'_{n2-1}$:    $entry(n2-1, 0), entry(n2-1, 1), entry(n2-1, 2), \ldots$

Figure 14c  1420

$entry(h'_i, x)$:    address of $B$ (example of 1510)

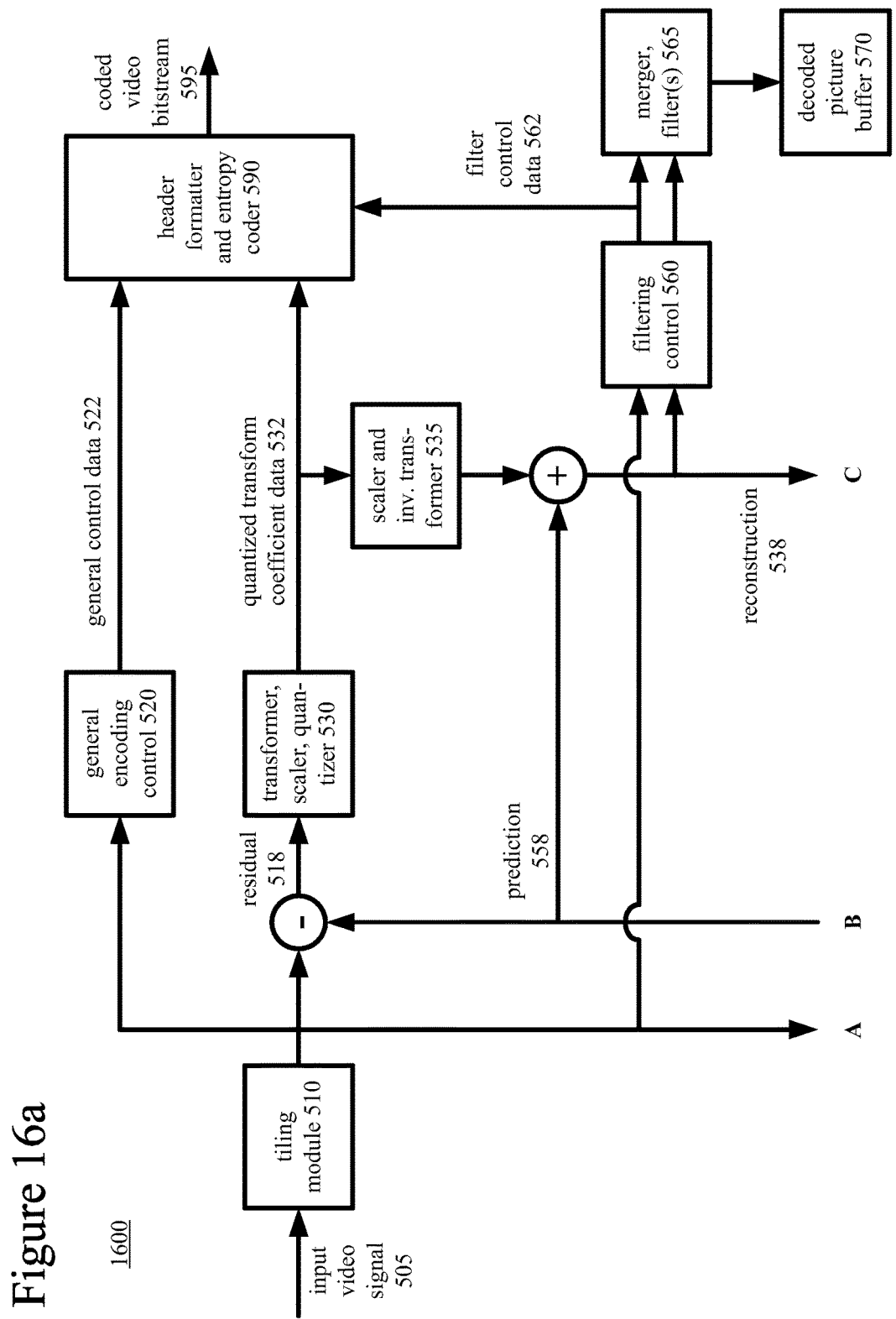

1600

(example of 1710)

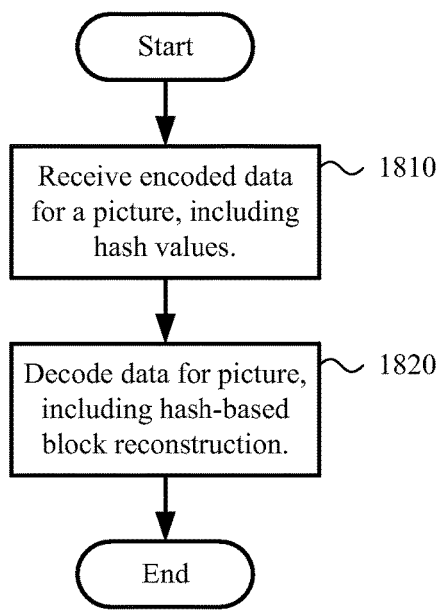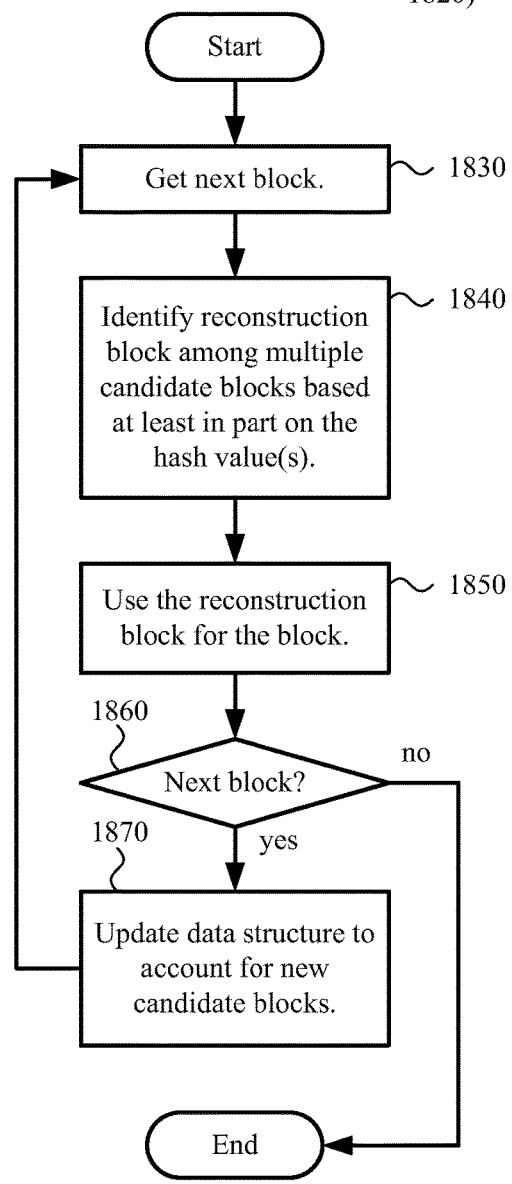
Figure 18a 1800
Figure 18b 1821 (example of 1820)

HASH-BASED BLOCK MATCHING IN VIDEO AND IMAGE CODING

CROSS REFERENCE TO RELATED APPLICATIONS

This is a U.S. National Stage of International Application No. PCT/CN2013/085937, filed Oct. 25, 2013, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M standard. More recently, the HEVC standard (ITU-T H.265 or ISO/IEC 23008-2) has been approved. Extensions to the HEVC standard (e.g., for scalable video coding/decoding, for coding/decoding of video with higher fidelity in terms of sample bit depth or chroma sampling rate, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

Intra block copy ("BC") is a prediction mode under consideration for HEVC extensions. For intra BC prediction mode, the sample values of a current block of a picture are predicted using previously reconstructed sample values in the same picture. A block vector ("BV") indicates a displacement from the current block to a region of the picture that includes the previously reconstructed sample values used for prediction. The BV is signaled in the bitstream. Intra BC prediction is a form of intra-picture prediction—intra BC prediction for a block of a picture does not use any sample values other than sample values in the same picture.

As currently specified in the HEVC standard and implemented in some reference software for the HEVC standard, intra BC prediction mode has several problems. For example, encoder-side decisions about which BV values to use in intra BC prediction are not made effectively.

SUMMARY

In summary, the detailed description presents innovations in hash-based block matching. For example, some of the innovations relate to use of hash-based block matching during block vector estimation for intra block copy ("BC") prediction, in which an encoder uses hash values for blocks when searching for a block that matches a current block being encoded. The hash-based block matching can use a dynamic data structure that organizes candidate blocks that may provide the matching block. The hash-based block matching can use a single hash function, or it can iteratively use multiple hash functions to provide hierarchical hash-based block matching. The encoder can perform the hash-based block matching using previously encoded then reconstructed sample values, or the encoder can perform the hash-based block matching using input sample values.

The innovations for hash-based block matching can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIGS. 5a and 5b are diagrams illustrating an example video encoder in conjunction with which some described embodiments can be implemented.

FIG. 10 is a table illustrating hash values for candidate blocks in hash-based block matching.

FIGS. 12a-12c are tables illustrating example data structures that organize candidate blocks for hash-based block matching.

FIGS. 13a and 13b are flowcharts illustrating a technique for encoding with a data structure that organizes candidate blocks for hash-based block matching.

FIGS. 14a-14c are tables illustrating example data structures that organize candidate blocks for hierarchical hash-based block matching.

FIGS. 16a and 16b are diagrams illustrating an example video encoder that determines hash values from input sample values.

FIGS. 18a and 18b are flowcharts illustrating a technique for decoding that uses signaled hash values to determine reconstruction blocks.

DETAILED DESCRIPTION

The detailed description presents innovations in the use of hash-based block matching. In particular, the detailed description presents innovations for encoding that uses hash-based block matching during block vector ("BV") estimation, for data structures that organize candidate blocks for hash-based block matching, and for hierarchical hash-based block matching.

Although operations described herein are in places described as being performed by a video encoder, in many cases the operations can be performed by another type of media processing tool (e.g., image encoder).

Some of the innovations described herein are illustrated with reference to syntax elements and operations specific to the HEVC standard. For example, reference is made to the draft version JCTVC-N1005 of the HEVC standard—"High Efficiency Video Coding (HEVC) Range Extensions Text Specification: Draft 4," JCTVC-N1005, July 2013. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
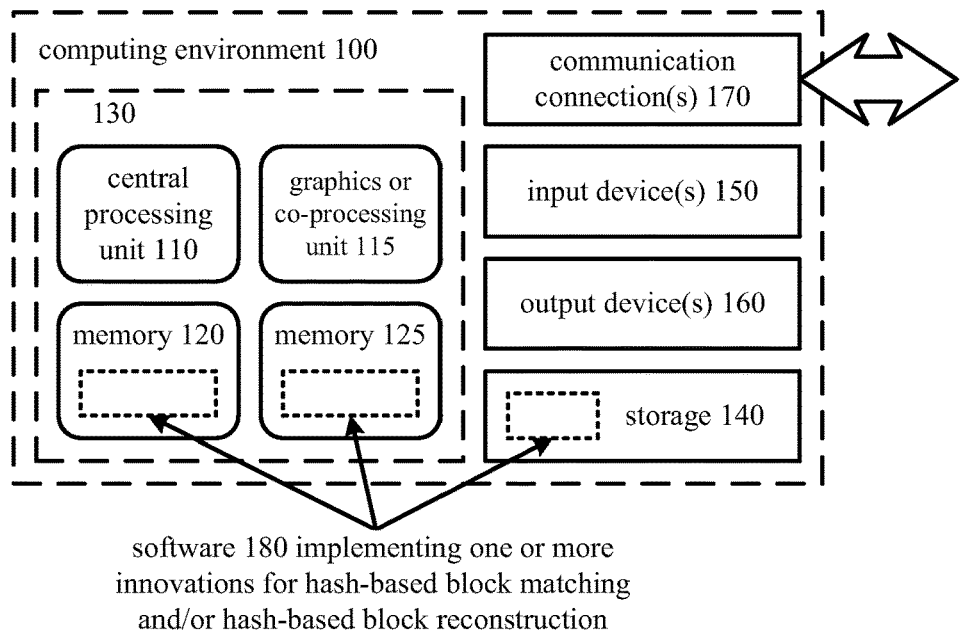
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for hash-based block matching and/or hash-based block reconstruction, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for hash-based block matching and/or hash-based block reconstruction.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
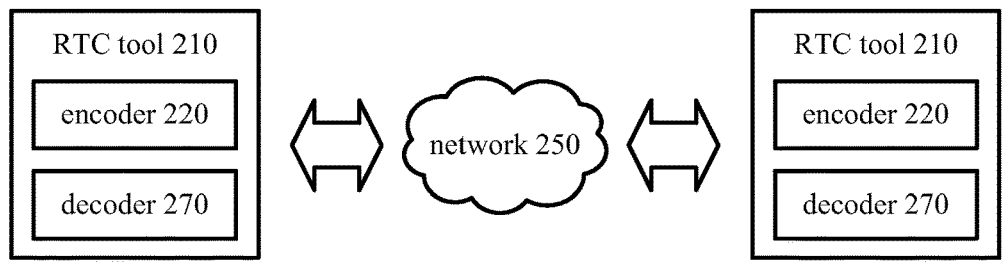
FIGS. 2a and 2b are diagrams of example network environments in which some described embodiments can be implemented.
Figure 2B:
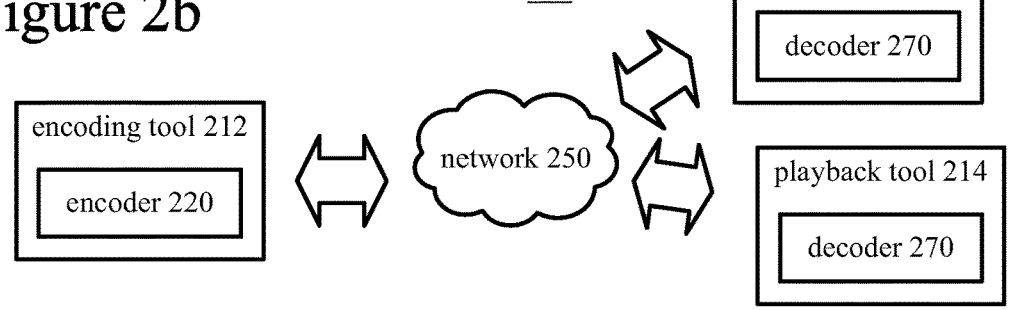

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 3:
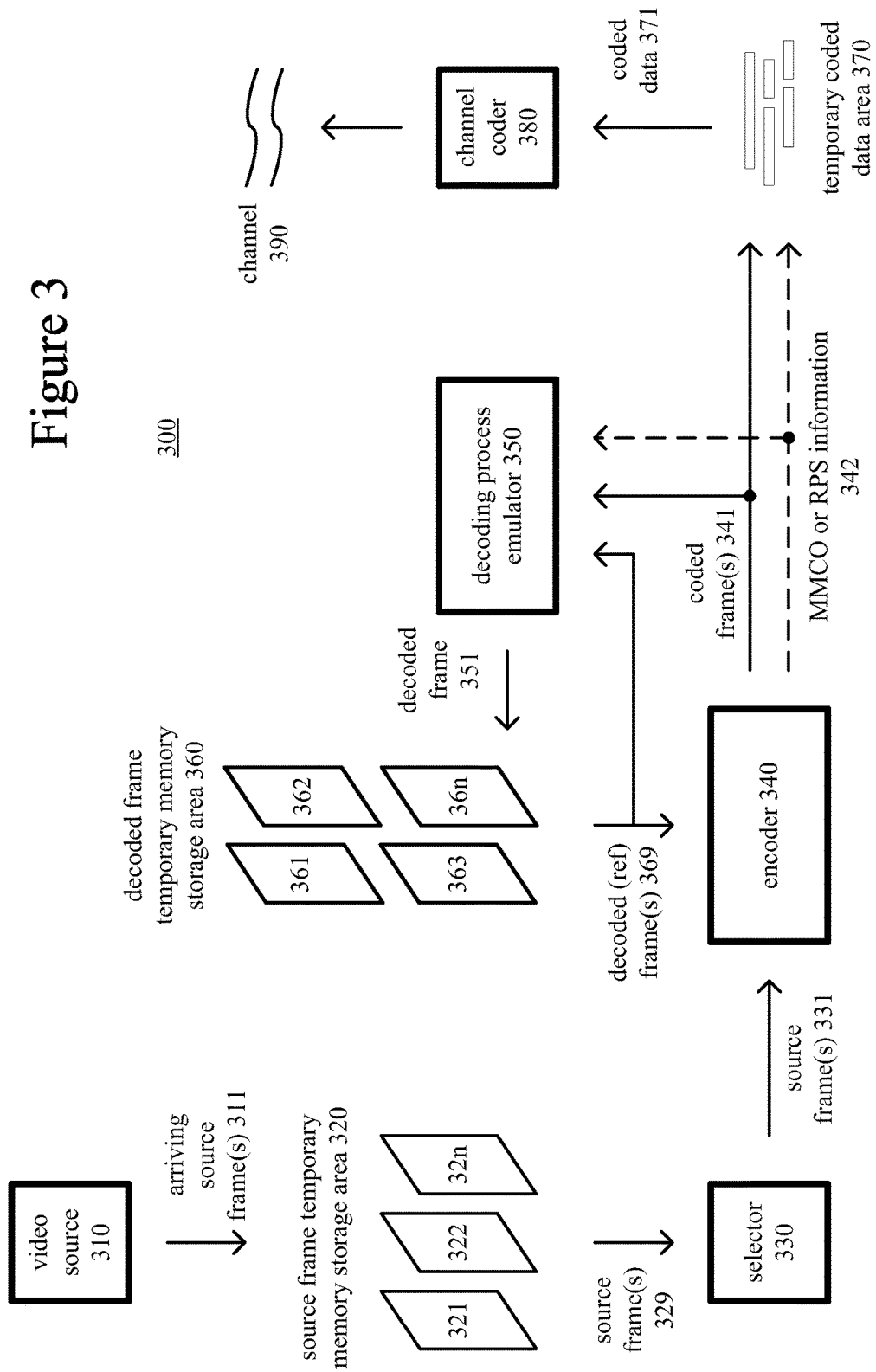
FIG. 3 is a diagram of an example encoder system in conjunction with which some described embodiments can be implemented.
Figure 4:
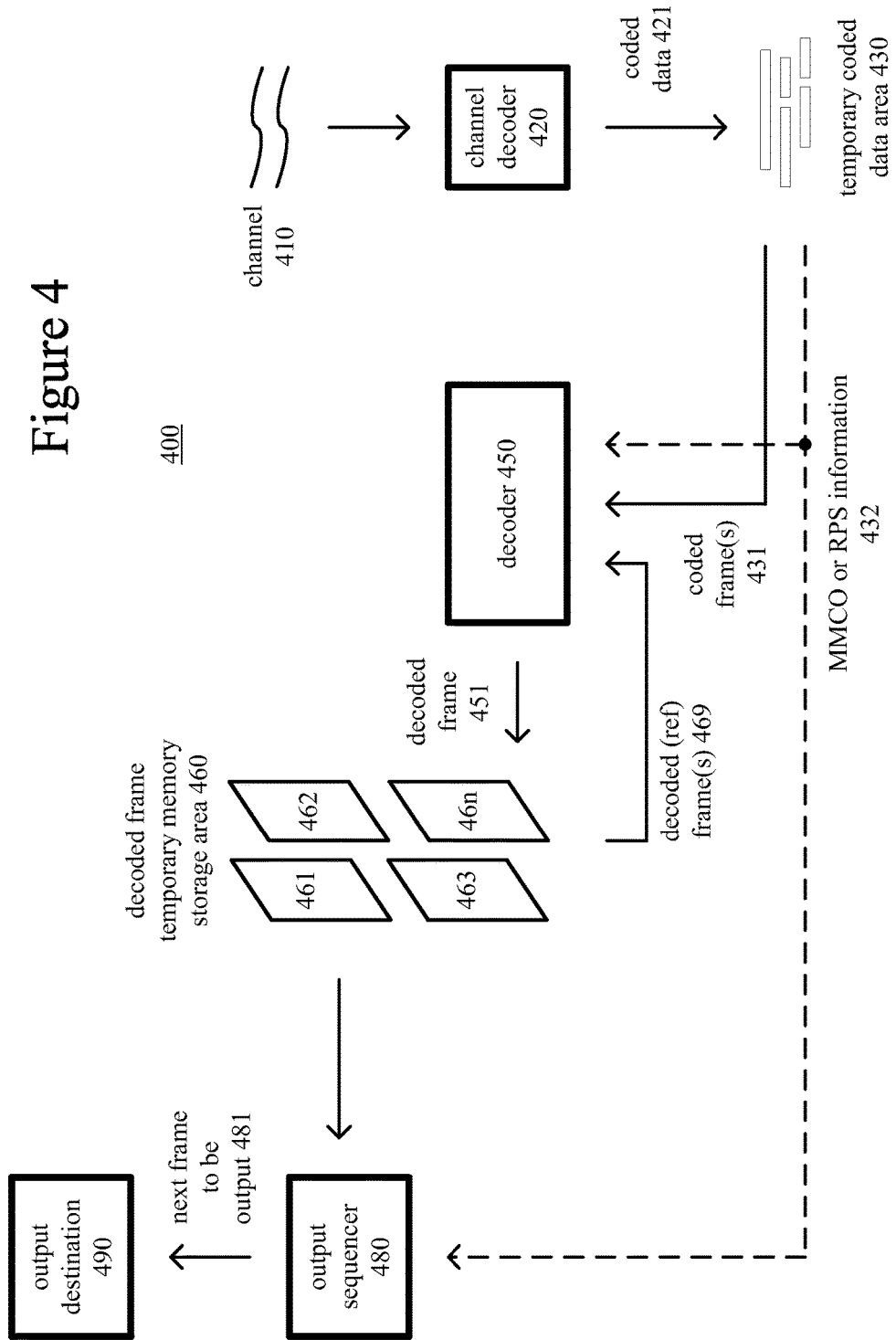
FIG. 4 is a diagram of an example decoder system.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system.

A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using hash-based block matching.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding. The pre-processing can also include color space conversion into primary and secondary components for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to improve options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. As used herein, the term "block" can indicate a CB, PB, TB or other set of sample values, depending on context. The encoder decides how to partition video into CTUs, CUs, PUs, TUs, etc.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values. An intra-prediction reference region is a region of samples in the frame that are used to generate BC-prediction values for the block. The intra-prediction region can be indicated with a block vector ("BV") value (determined in BV estimation then encoded) or, alternatively, a hash value that indicates a reconstruction block in a block hash dictionary. For intra spatial prediction for a block, the intra-picture estimator estimates extrapolation of the neighboring reconstructed sample values into the block. The intra-picture estimator outputs prediction information (such as BV values or hash values for intra BC prediction and prediction mode (direction) for intra spatial prediction), which is entropy coded. An intra-prediction predictor applies the prediction information to determine intra prediction values.

The encoder (340) represents an inter-coded, predicted block of a source frame (331) in terms of prediction from reference frames. A motion estimator estimates motion of the block with respect to one or more reference frames (369). When multiple reference frames are used, the multiple reference frames can be from different temporal directions or the same temporal direction. A motion-compensated prediction reference region is a region of samples in the reference frame(s) that are used to generate motion-compensated prediction values for a block of samples of a current frame. The motion estimator outputs motion information such as motion vector information, which is entropy coded. A motion compensator applies motion vectors to reference frames (369) to determine motion-compensated prediction values.

The encoder determines the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., motion vector information, BV values, hash values, QP values, mode decisions, parameter choices). Typical entropy coding techniques include Exp-Golomb coding, arithmetic coding, differential coding, Huffman coding, run length coding, variable-length-to-variable-length ("V2V") coding, variable-length-to-fixed-length ("V2F") coding, LZ coding, dictionary coding, probability interval partitioning entropy coding ("PIPE"), and combinations of the above. The entropy coder can use different coding techniques for different kinds of information, and can choose from among multiple code tables within a particular coding technique.

The coded frames (341) and MMCO/RPS information (342) are processed by a decoding process emulator (350). The decoding process emulator (350) implements some of the functionality of a decoder, for example, decoding tasks to reconstruct reference frames. The decoding process emulator (350) uses the MMCO/RPS information (342) to determine whether a given coded frame (341) needs to be reconstructed and stored for use as a reference frame in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the MMCO/RPS information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize the aggregated data for transmission as a media stream (e.g., according to a media stream multiplexing format such as ISO/IEC 13818-1), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output.

IV. Example Decoder Systems.

FIG. 4 is a block diagram of an example decoder system (400). The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include content encoded using hash-based block matching.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream (e.g., according to a media stream multiplexing format such as ISO/IEC 13818-1), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s).

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms, intra prediction, motion compensation and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra prediction module can spatially predict sample values of a current block from neighboring, previously reconstructed sample values or, for intra BC prediction, predict sample values of a current block using previously reconstructed sample values of an intra-prediction region in the frame. The intra-prediction region can be indicated with a BV value or, alternatively, a hash value that indicates a reconstruction block in a block hash dictionary. The decoder (450) also reconstructs prediction residuals. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency domain data into spatial domain information. For an inter-predicted block, the decoder (450) combines reconstructed prediction residuals with motion-compensated predictions. The decoder (450) can similarly combine prediction residuals with predictions from intra prediction. A motion compensation loop in the video decoder (450) includes an adaptive de-blocking filter to smooth discontinuities across block boundary rows and/or columns in the decoded frame (451).

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders.

Figure 5B:
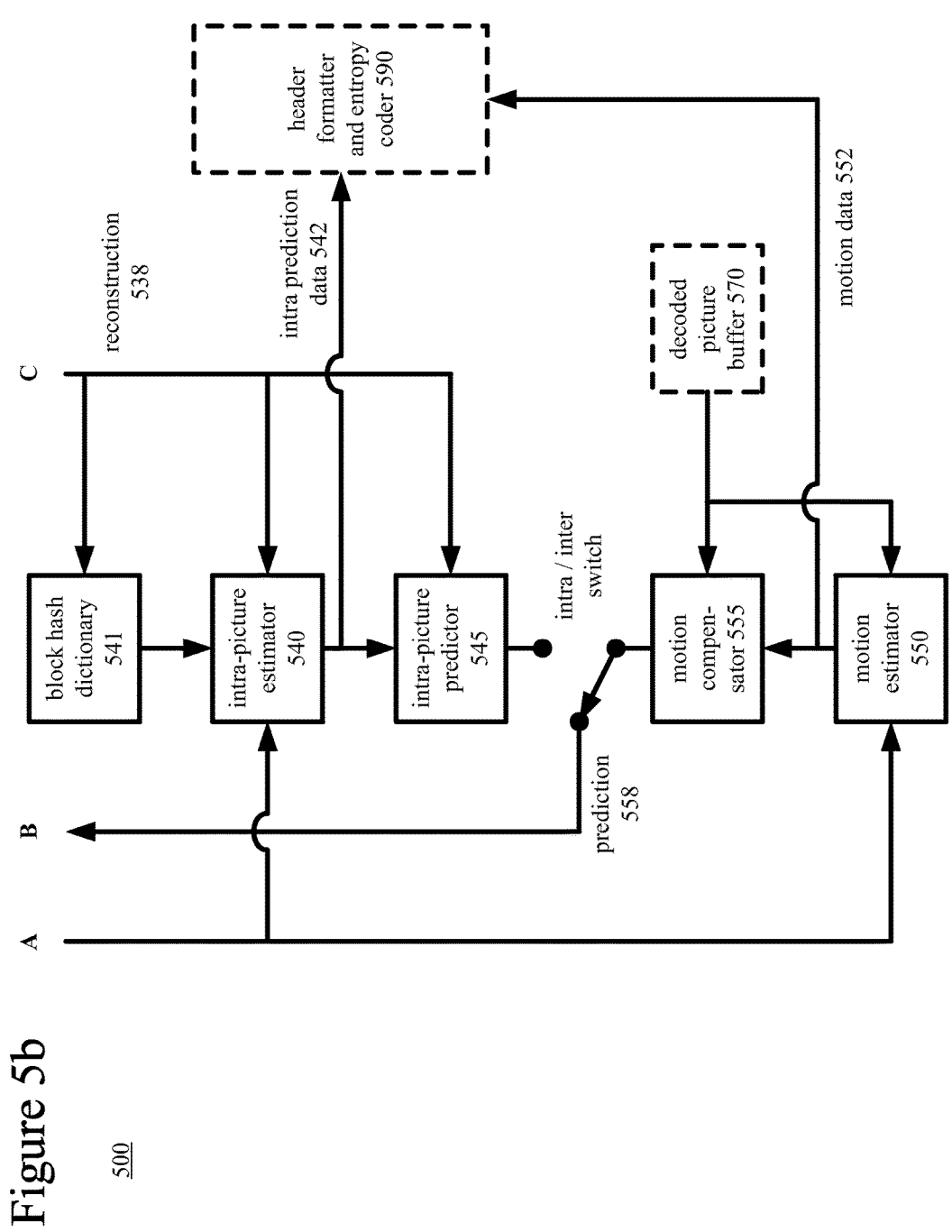

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use hash-based block matching during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates motion of blocks of sample values of the current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as motion vector data and reference picture selection data. The motion data (552) is provided to the header formatter/entropy coder (590) as well as the motion compensator (555).

The motion compensator (555) applies motion vectors to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. Or, for intra BC prediction using BV values, the intra-picture estimator (540) estimates displacement of the sample values of the current block to different candidate regions within the current picture. For hash-based block matching during the BV estimation, the intra-picture estimator (540) can use a block hash dictionary (541) to find a BV value for a current block. The block hash dictionary (541) is a data structure that organizes candidate blocks for hash-based block matching, as described below. The block hash dictionary (541) can be updated during encoding to store information about new candidate blocks, as those candidate blocks become available for use in hash-based block matching. Alternatively, instead of using BV values, intra BC prediction can use hash values that represent blocks. In this case, for hash-based block matching, the intra-picture estimator (540) can use a block hash dictionary (541) to find a hash value to use to represent a current block, as described below.

The intra-picture estimator (540) produces as side information intra prediction data (542), such as information indicating whether intra prediction uses spatial prediction or BC prediction (e.g., a flag value per intra block), prediction mode direction (for intra spatial prediction) and BV values or hash values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of the current block using previously reconstructed sample values of an intra-prediction region, which is indicated by a BV value for the current block (or is indicated by the hash value in a block hash dictionary (541)). When the chroma data for a picture has the same resolution as the luma data (e.g. when the format is YUV 4:4:4 format or RGB 4:4:4 format), the BV value that is applied for the chroma block may be the same as the BV value applied for the luma block. On the other hand, when the chroma data for a picture has reduced resolution relative to the luma data (e.g. when the format is YUV 4:2:0 format), the BV value that is applied for the chroma block may be scaled down and possibly rounded to adjust for the difference in chroma resolution (e.g. by dividing the vertical and horizontal components of the BV value by two and truncating or rounding them to integer values). When a hash value represents a reconstruction block (from block hash dictionary (541)) for luma sample values of a frame, reconstruction blocks for chroma sample values at corresponding locations in the frame can be used.

The intra/inter switch selects values of a motion-compensated prediction or intra-picture prediction for use as the prediction (558) for a given block. The difference (if any) between a block of the prediction (558) and corresponding part of the original current picture of the input video signal (505) provides values of the residual (518). During reconstruction of the current picture, reconstructed residual values are combined with the prediction (558) to produce a reconstruction (538) of the original content from the video signal (505). In lossy compression, however, some information is still lost from the video signal (505).

In the transformer/scaler/quantizer (530), a frequency transformer converts spatial domain video information into frequency domain (i.e., spectral, transform) data. For block-based video coding, the frequency transformer applies a discrete cosine transform ("DCT"), an integer approximation thereof, or another type of forward block transform to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies non-uniform, scalar quantization to the frequency domain data with a step size that varies on a frame-by-frame basis, tile-by-tile basis, slice-by-slice basis, block-by-block basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residuals or sample values. The encoder (500) combines reconstructed residuals with values of the prediction (558) (e.g., motion-compensated prediction values, intra-picture prediction values) to form the reconstruction (538).

For intra-picture prediction, the values of the reconstruction (538) can be fed back to the intra-picture estimator (540) and intra-picture predictor (545). Values of the reconstruction (538) can also be used to update the block hash dictionary (541). Also, the values of the reconstruction (538) can be used for motion-compensated prediction of subsequent pictures. The values of the reconstruction (538) can be further filtered. A filtering control (560) determines how to perform deblock filtering and sample adaptive offset ("SAO") filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For example, the header formatter/entropy coder (590) uses context-adaptive binary arithmetic coding for entropy coding of various syntax elements.

The header formatter/entropy coder (590) provides the encoded data in the coded video bitstream (595). The format of the coded video bitstream (595) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

Figure 6:
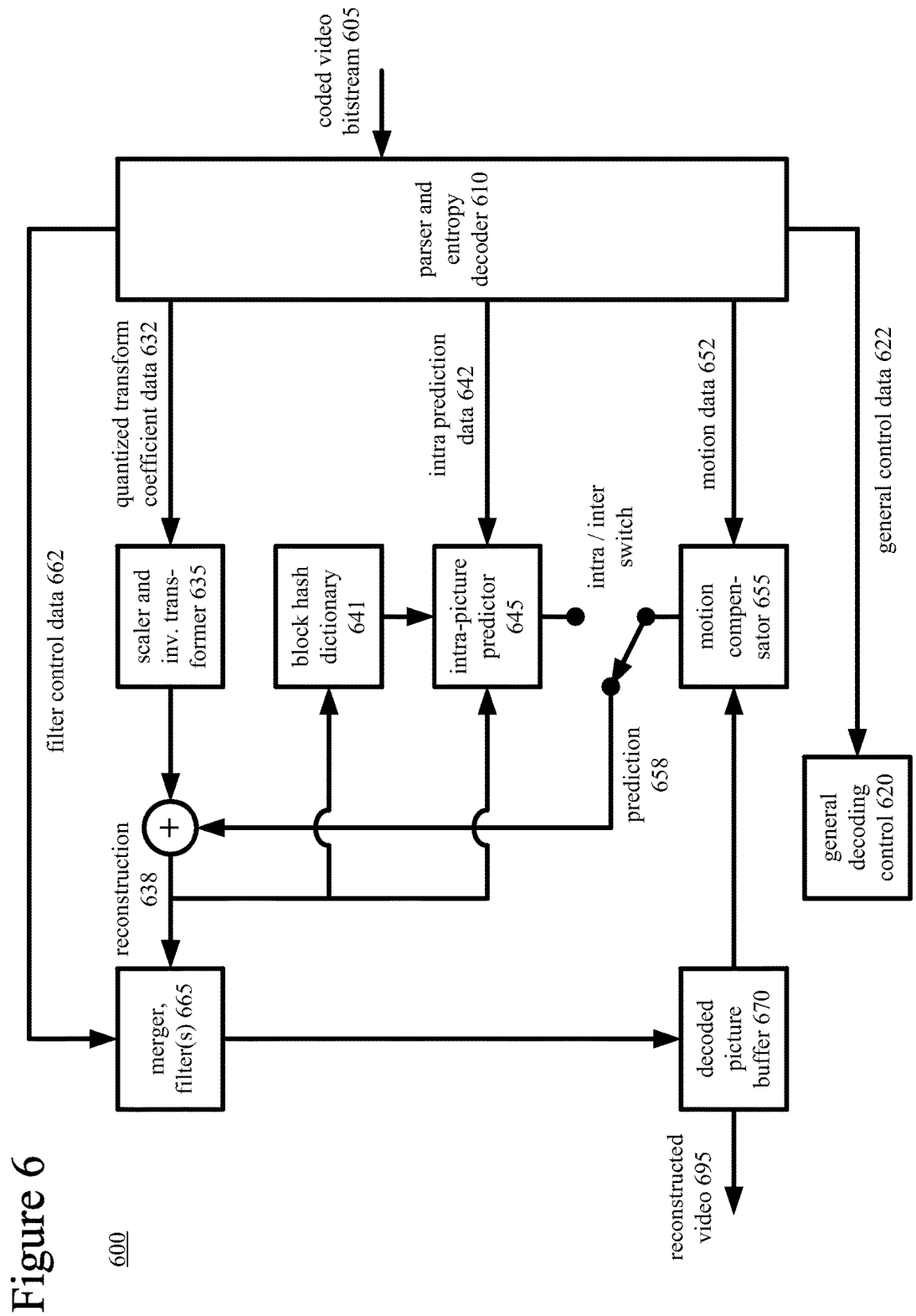
FIG. 6 is a diagram illustrating an example video decoder.

FIG. 6 is a block diagram of a generalized decoder (600). The decoder (600) receives encoded data in a coded video bitstream (605) and produces output including pictures for reconstructed video (695). The format of the coded video bitstream (605) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662).

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as motion vector data and reference picture selection data. The motion compensator (655) applies motion vectors to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-prediction predictor (645) receives the intra prediction data (642), such as information indicating whether intra prediction uses spatial prediction or BC prediction (e.g., a flag value per intra block), prediction mode direction (for intra spatial prediction) and BV values or hash values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction using BV values, the intra-picture predictor (645) predicts the sample values of the current block using previously reconstructed sample values of an intra-prediction region, which is indicated by a BV value for the current block. Alternatively, for intra BC prediction using hash values, the intra-picture predictor (645) determines a reconstruction block for a current block using a signaled hash value for the current block. In this case, the intra-picture predictor (645) uses a block hash dictionary (641) to find the reconstruction block for a signaled hash value. The block hash dictionary (641) is a data structure that organizes candidate block values according to hash value.

The intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted CUs. The decoder (600) combines the prediction (658) with reconstructed residual values to produce the reconstruction (638) of the content from the video signal.

To reconstruct the residual, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residuals or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform.

For intra-picture prediction, the values of the reconstruction (638) can be fed back to the intra-picture predictor (645). Values of the reconstruction (638) can be used to update the block hash dictionary (641). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing deblock filter. The post-processing deblock filter optionally smoothes discontinuities in reconstructed pictures. Other filtering (such as de-ring filtering) can also be applied as part of the post-processing filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Hash-Based Block Matching.

This section presents various features of hash-based block matching. Some of the features relate to encoding that uses hash-based block matching during block vector ("BV") estimation, while other features relate to data structures that organize candidate blocks for hash-based block matching. Still other features relate to hierarchical hash-based block matching. These features can facilitate intra block copy ("BC") prediction that is more effective in terms of rate-distortion performance (by selecting better BV values, compared to other approaches) and/or computational efficiency (by selecting BV values more efficiently, compared to other approaches).

In particular, hash-based block matching can improve rate-distortion performance when encoding certain "artificially" created video content such as screen-capture content. Screen-capture content typically includes repeated structures (e.g., graphics, text characters), which provide opportunities for hash-based block matching to improve performance. Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen-capture content include remote desktop conferencing and encoding/decoding of graphical overlays on natural video or other "mixed content" video.

A. Intra BC Prediction Mode and BV Values—Introduction.

For intra BC prediction, the sample values of a current block of a picture are predicted using sample values in the same picture. A BV value indicates a displacement from the current block to a region of the picture that includes the sample values used for prediction. The sample values used for prediction are previously reconstructed sample values. The BV value is signaled in the bitstream, and a decoder can use the BV value to determine the region of the picture to use for prediction, which is also reconstructed at the decoder. Intra BC prediction is a form of intra-picture prediction—intra BC prediction for a block of a picture does not use any sample values other than sample values in the same picture.

Figure 7:
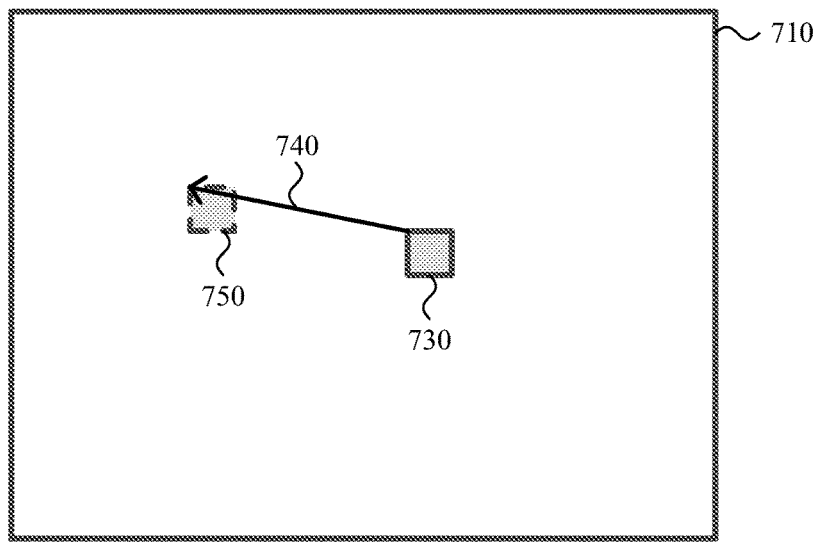
FIG. 7 is diagram illustrating intra BC prediction for a block of a picture.

FIG. 7 illustrates intra BC prediction for a current block (730) of a current frame (710). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. More generally, the size of the current block is m×n, where each of m and n is a whole number, and where m and n can be equal to each other or can have different values. Alternatively, the current block can have some other shape (e.g., an area of a coded video object with a non-rectangular shape).

The BV (740) indicates a displacement (or offset) from the current block (730) to a region (750) of the picture that includes the sample values used for prediction. The intra-prediction region (750) indicated by BV (740) is sometimes termed the "matching block" for the current block (730). The matching block can be identical to the current block (730), or it can be an approximation of the current block (730). Suppose the top left position of a current block is at position ($x_0$, $y_0$) in the current frame, and suppose the top left position of the intra-prediction region is at position ($x_1$, $y_1$) in the current frame. The BV indicates the displacement ($x_1$-$x_0$, $y_1$-$y_0$). For example, if the top left position of the current block is at position (320, 256), and the top left position of the intra-prediction region is at position (295, 270), the BV value is (−25, 14). In this example, a negative horizontal displacement indicates a position to the left of the current block, and a negative vertical displacement indicates a position above the current block.

Intra BC prediction can improve coding efficiency by exploiting redundancy (such as repeated patterns inside a frame) using block copy operations. Finding a matching block for a current block can be computationally complex and time consuming, however, considering the number of candidate blocks that the encoder may evaluate. Comparing the sample values of a current block to the sample values of a single candidate block in sample-wise block matching can involve thousands of operations. For example, comparing the sample values of a 64×64 current block and 64×64 candidate block can involve 64×64=4096 comparison operations (e.g., subtraction operations) as well as operations to tally results of the comparison operations.

Figure 8:
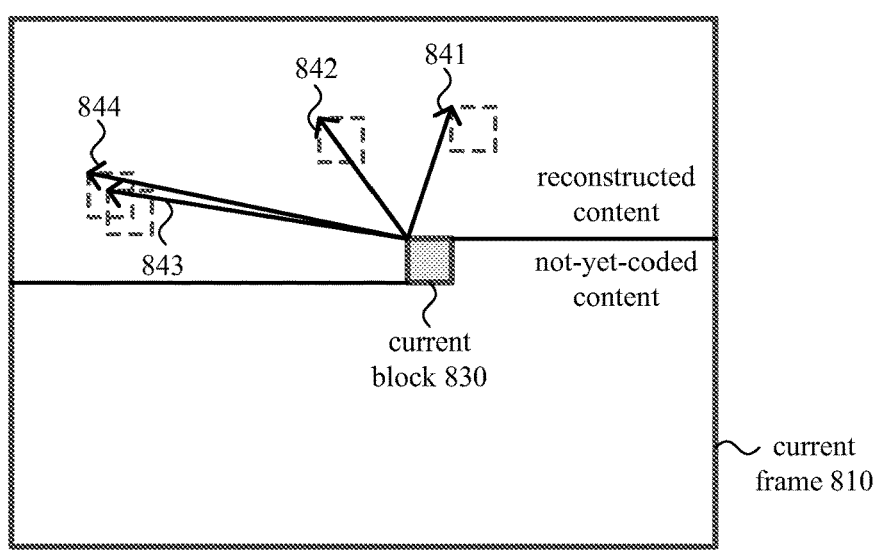
FIG. 8 is a diagram illustrating candidate blocks for a block of a frame in block matching.

FIG. 8 shows some of the candidate blocks for a current block (830) of a current frame (810) in block matching operations. Four BVs (841, 842, 843, 844) indicate displacements for four candidate blocks. The candidate blocks can be anywhere within the reconstructed content of the frame (810). (Blocks are coded from left-to-right, then from top-to-bottom.) A candidate block can overlap with other candidate blocks, as shown for the candidate blocks indicated by the BVs (843, 844). The computational complexity of BV estimation is especially problematic when the search range for BV values encompasses all of the previously reconstructed areas of a frame.

Figure 9:
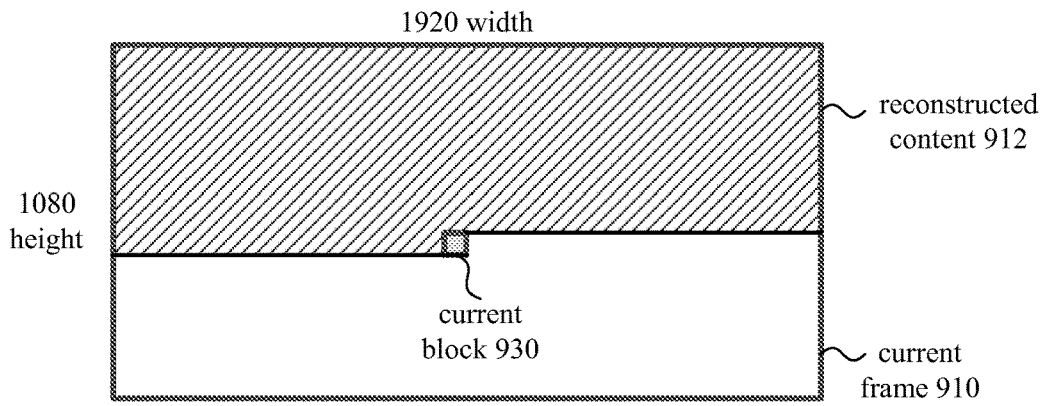
FIG. 9 is a diagram illustrating the number of candidate blocks in block matching for a block of an example frame.

FIG. 9 illustrates the number of candidate blocks for block matching for a block (930) of an example frame (910) having a width of 1920 sample values and a height of 1080 sample values. The current block (930) is a 64×64 block at position (896, 576) in the frame (910), and the candidate blocks are also 64×64 blocks. The search area for the candidate blocks is shown with hatched lines in FIG. 9. Any 64×64 block within the search area can be considered a candidate block. The number of candidate blocks within the frame (910) is given by: (yposition$_{block}$−height$_{block}$+1)× (width$_{frame}$−width$_{block}$+1)+(xposition$_{block}$−width$_{block}$+1), where xposition$_{block}$ and yposition$_{block}$ indicate the position of the current block (930) in the frame (910), width$_{fame}$ is the width of the frame (910) and width$_{block}$ and height$_{block}$ are the dimensions of the current block (930). For the values shown in FIG. 9, there are (576−64+1)×(1920−64+1)+(896−64+1)=953,474 candidate blocks in the search area for the current block (930). Performing sample-wise block matching operations between the current block (930) and even a small set of the possible candidate blocks would be very computationally intensive. If the search range includes another previously reconstructed frame, the number of operations is even higher.

B. Hash-Based Block Matching.

When an encoder uses hash-based block matching, the encoder determines a hash value for each of multiple candidate blocks. The encoder also determines a hash value for a current block. If two blocks are identical, their hash values are the same. Using hash values, an encoder can quickly and efficiently identify candidate blocks that have the same hash value as the current block, and filter out candidate blocks that have different hash values. The encoder can then further evaluate those candidate blocks having the same hash value as the current block. Hash-based block matching speeds up the process of finding a matching block for a current block.

FIG. 10 illustrates hash values (1000) for candidate blocks B(x, y) in hash-based block matching, where x and y indicate horizontal and vertical coordinates, respectively, for the top left position of a given candidate block. The candidate blocks have hash values determined using a hash function h( ) For each candidate block B(x, y) in a search range, the encoder determines a hash value h(B) for the candidate block. In general, the hash function h( ) yields n possible hash values, designated $h_0$ to $h_{n-1}$. For a given hash value, the candidate blocks with that hash value are grouped. For example, in FIG. 10, the candidate blocks B(1266, 263), B(1357, 365), B(1429, 401), B(502, 464), . . . have the hash value $h_0$. Groups can include different numbers of candidate blocks. For example, in FIG. 10, the group for hash value $h_4$ includes a single candidate block, while the group for hash value $h_0$ includes more than four candidate blocks.

In this way, the possible candidate blocks are distributed into n categories. For example, if the hash function h( )

produces 12-bit hash values, the 953,474 candidate blocks in FIG. 9 are split into $2^{12}$=4,096 categories, with each category including an average of 233 candidate blocks assuming an even distribution of candidate blocks into hash value categories. In some implementations (see section C), the number of candidate blocks per hash value can be further reduced by eliminating redundant, identical blocks with that hash value. Also, in some implementations (see section D), the encoder can iteratively winnow down the number of candidate blocks using different hash functions.

The hash function h( ) can be a cyclic redundancy check ("CRC") function or other hash function. Some types of hash function (e.g., CRC function) map similar blocks to different hash values, which may be efficient when seeking a matching block that exactly corresponds with a current block. Other types of hash function (e.g., locality-sensitive hash function) map similar blocks to the same hash value, which may be suitable when a matching block can approximate the current block. Example hash functions are described below.

With the hash function h( ), the encoder determines the hash value for the current block $B_{current}$. In FIG. 10, the hash value $h(B_{current})$ is $h_3$. Using the hash value of the current block, the encoder can identify candidate blocks that have the same hash value (shown in outlined box in FIG. 10), and filter out the other candidate blocks. When a hash function maps similar blocks to different hash values, the identified candidate blocks (same hash value as the current block) include blocks that might be identical to the current block. When a hash function maps similar blocks to the same hash value, the identified candidate blocks (same hash value as the current block) include blocks that might be identical to the current block or might be close approximations of the current block. Either way, from these identified candidate blocks, the encoder can identify a matching block for the current block (e.g., using sample-wise block matching operations).

Overall, since hash value comparisons are much simpler than sample-wise block matching, hash-based block matching can make the process of evaluating the candidate blocks in a large search range much more efficient. Also, hash values for candidate blocks can be reused in hash-based block matching for different blocks within a picture, so the cost of computing the hash values for the candidate blocks can be amortized across hash-based block matching operations for the entire picture.

Figure 11A:
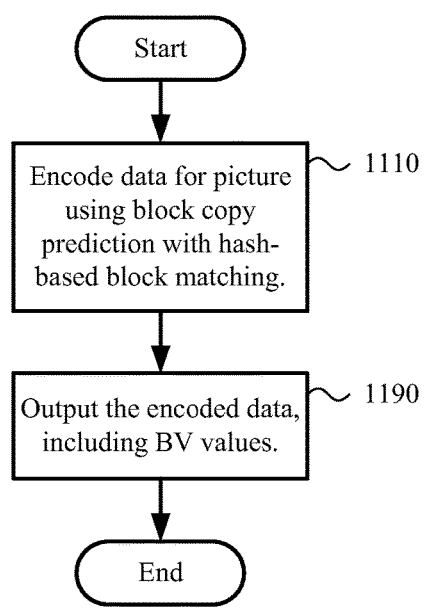
FIGS. 11a and 11b are flowcharts illustrating a technique for encoding a picture using hash-based block matching during BV estimation.

FIG. 11a shows a generalized technique (1100) for encoding a picture using hash-based block matching during BV estimation. An encoder such as one described with reference to FIG. 3 or FIGS. 5a-5b can perform the technique (1100).

The encoder encodes (1110) data for a picture, using BC prediction with hash-based block matching. The BC prediction can be intra BC prediction (if the candidate blocks are in the same picture as a current block), or the BC prediction can reference candidate blocks in another picture (in the same video sequence, in another video sequence, or for a sprite or generated reference picture). The candidate blocks are part of a search range, which can include all previously reconstructed content in the picture with the current block (or another picture), or can include a subset of the previously reconstructed content (e.g., reconstructed content in the current CTU and one or more other CTUs in the picture with the current block, or reconstructed content in the same tile as the current block, or reconstructed content in the same slice as the current block). When it encodes (1110) the data for the picture, the encoder can perform the technique (1111) shown in FIG. 11b. Or, the encoder can perform the encoding (1110) of the data for the picture in some other way, for example, using hierarchical hash-based block matching.

Figure 11B:
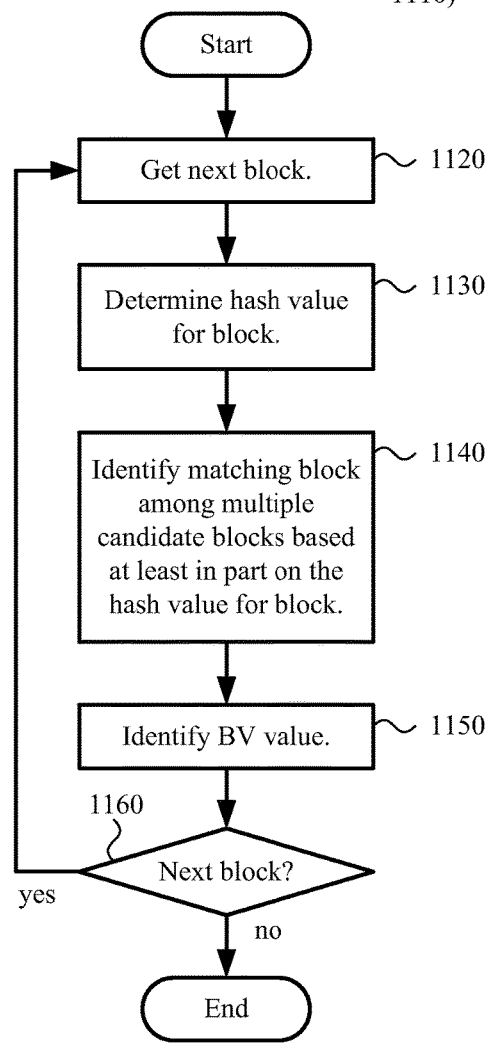

According to the technique (1111) of FIG. 11b, the encoder gets (1120) the next block to be encoded and determines (1130) a hash value for that block, as the current block. The hash function can be a CRC function, locality-sensitive hash function, or other hash function.

The encoder identifies (1140) a matching block among multiple candidate blocks based at least in part on the hash value for the current block. For example, for one or more of the candidate blocks, the encoder compares the hash value for the current block to a hash value for the candidate block. Or, when a data structure organizes the candidate blocks according to hash value, the encoder uses the hash value for the current block to select a candidate block list, then determines the matching block among any candidate blocks in the selected list (e.g., performing block matching operations between sample values of the current block and a given candidate block).

If BV estimation succeeds, the encoder identifies (1150) a BV value for the matching block to use for the current block. For example, the BV value indicates a displacement between the top left position of the current block and the top left position of the matching block. The encoder can encode the BV value, e.g., using CABAC or another form of entropy coding. Otherwise, if BV estimation fails, the encoder can encode the current block using spatial intra prediction or another form of intra-picture prediction.

When a data structure organizes candidate blocks according to hash value, the encoder can update the data structure to account for new candidate blocks that overlap the just encoded block. The encoder checks (1160) whether to continue with the next block of the picture. If so, the encoder gets (1120) the next block and determines (1130) the hash value for it.

Returning to FIG. 11a, the encoder outputs (1190) the encoded data, which includes the BV values. The encoder can repeat the technique (1100) for the next picture.

C. Data Structures for Hash-Based Block Matching.

In some example implementations, the encoder uses a data structure that organizes candidate blocks according to their hash values. The data structure can help make hash-based block matching more computationally efficient.

FIG. 12a illustrates an example data structure (1200) that organizes candidate blocks for hash-based block matching. For the hash function h( ), the n possible hash values are $h_0$ to $h_{n-1}$. Candidate blocks with the same hash value are classified in the same candidate block list. A given candidate block list can include zero or more entries. For example, the candidate block list for the hash value $h_2$ has no entries, the list for the hash value $h_6$ has two entries, and the list for the hash value $h_1$ has more than four entries.

An entry($h_i$, x) includes information for the $x^{th}$ candidate block with the hash value $h_i$. As shown in FIG. 12b, an entry in a candidate block list can include the address of a block B(x, y) (e.g., horizontal and vertical coordinates for the top left position of the block). Or, as shown in FIG. 12c, an entry in a candidate block list can include the address of a block B(x, y) and a hash value from a second hash function, which can be used for hierarchical hash-based block matching (see section D).

During hash-based block matching for a current block, the encoder determines the hash value of the current block $h(B_{current})$ The encoder retains the candidate block list with the same hash value and rules out the other n-1 lists. To select the matching block, the encoder can compare the current block with the candidate blocks in the retained candidate block list. Thus, by a simple lookup operation using the hash value $h(B_{current})$, the encoder can eliminate $(n-1)/n$ of the candidate blocks (on average), and focus on the remaining $1/n$ candidate blocks (on average) in the retained list, significantly reducing the number of sample-wise block matching operations.

The data structure can be considered a dynamic dictionary in which each entry represents a candidate block. The data structure can grow during encoding, as more candidate blocks are added to the reconstructed content of a picture and hence made available for use in hash-based block matching for later blocks of the picture. In particular, after a current block is encoded, new candidate blocks that overlap the just-encoded current block are available for use in hash-based block matching. For example, after an 8×8 block is encoded, the 8×8 block is available as a candidate block. The seven 8×8 blocks located at incremental shifts of one sample position left of the current block are also available as candidate blocks. And, for each of the seven rows at incremental shifts of one sample position up from the current block, eight 8×8 blocks are available as candidate blocks. Thus, entries for 8×8=64 new candidate blocks can be added to the data structure after a current 8×8 block is encoded. Similarly, after a current 64×64 block is encoded, 4096 entries for candidate blocks can be added to the data structure.

Different data structures can be used for different sizes of blocks. For example, one data structure includes hash values for 8×8 candidate blocks, a second data structure includes hash values for 16×16 candidate blocks, a third data structure includes hash values for 32×32 candidate blocks, and so on. The data structure used during hash-based block matching depends on the size of the current block. After a current block of any size is encoded, all data structures can be updated, where new candidate blocks have been made available for hash-based block matching.

For a high-resolution picture, the data structure can store information representing a very large number of candidate blocks. To reduce the amount of memory used for the data structure, the encoder can eliminate redundant values. For example, the encoder can avoid adding identical blocks to the data structure by using the following approach. Before adding a new candidate block $B_{new}$ to the data structure, the encoder checks if there is already a candidate block represented in the data structure that is identical to $B_{new}$. For this check, the encoder can determine the hash value for the new candidate block, then further evaluate those candidate blocks represented in the data structure that have the same hash value. (Candidate blocks with different hash values are necessarily different than the new candidate block $B_{new}$.) If the data structure already includes a candidate block that is identical to $B_{new}$, then $B_{new}$ is added instead of the previous identical candidate block, or the previous identical candidate block is simply retained. If the data structure does not include a candidate block that is identical to $B_{new}$, then $B_{new}$ is added to the data structure.

In general, reducing the size of the data structure by eliminating identical blocks can hurt coding efficiency. When multiple identical candidate blocks are potentially available, they may result in different BV values for a current block, where one of the BV values can be encoded with fewer bits than the other(s). If only one of the multiple identical candidate blocks is retained in the data structure, the encoder might not learn of a BV value that would be more efficiently encoded for the current block. Thus, by deciding whether to eliminate identical blocks, the encoder can trade off memory size for the data structure and coding efficiency.

FIG. 13a shows a generalized technique (1300) for encoding with a data structure that organizes candidate blocks for hash-based block matching. An encoder such as one described with reference to FIG. 3 or FIGS. 5a-5b can perform the technique (1300).

The encoder creates (1310) a data structure that organizes multiple candidate blocks according to hash value. For example, the encoder creates a data structure as explained with reference to FIGS. 12a and 12b, with a list of block addresses for each of one or more possible hash values. Or, the encoder creates a data structure as explained with reference to FIGS. 12a and 12c. Or, the encoder creates another data structure that organizes the multiple candidate blocks according to hash value.

The encoder encodes (1320) data for a picture, including using the data structure in hash-based block matching. The hash-based block matching can be for intra BC prediction (if the candidate blocks are in the same picture as a current block), or the hash-based block matching can reference candidate blocks in another picture (in the same video sequence, in another video sequence, or for a sprite or generated reference picture). When it encodes (1320) the data for the picture, the encoder can perform the technique (1321) shown in FIG. 13b. Or, the encoder can perform the encoding (1320) of the data for the picture in some other way.

According to the technique (1321) of FIG. 13b, the encoder gets (1330) the next block to be encoded and encodes (1340) the block, using the data structure in hash-based block matching if BC prediction is used. For example, the encoder determines a hash value for the block, uses the hash value for the block to select a candidate block list, and determines a matching block among any candidate blocks in the selected list (e.g., performing block matching operations between sample values of the block and a given candidate block).

After the block is encoded, the encoder checks (1350) whether to continue with the next block of the picture. If so, the encoder updates (1360) the data structure to account for new candidate blocks that overlap the just-encoded block. The encoder gets (1330) the next block and encodes (1340) the block using the data structure.

When it updates the data structure, the encoder can follow any of various approaches. For example, for each of the new candidate blocks, the encoder determines a hash value for the new candidate block and evaluates whether the new candidate block is identical to any candidate block already represented in the data structure. If so, the encoder keeps either the new candidate block or the identical block in the data structure. If not, the encoder adds the new candidate block to the data structure. Or, when hierarchical hash-based block matching is used (see below), for each of the new candidate blocks, the encoder determines first and second hash values for the new candidate block using first and second hash functions, respectively, then uses the first and second hash values to evaluate whether the new candidate block is identical to any candidate block already represented in the data structure. If so, the encoder keeps either the new candidate block or the identical block in the data structure. If not, the encoder adds the new candidate block to the data structure.

The encoder outputs (1390) the encoded data for the picture. The encoder can repeat the technique (1300) for the next picture.

D. Hierarchical Hash-Based Block Matching.

When the encoder uses a single hash function with n possible hash values, the encoder can rule out n-1 lists of candidate blocks based on the hash value of a current block, but the encoder may still need to perform sample-wise block matching operations for the remaining candidate blocks. When updating a data structure that organizes candidate blocks, the encoder may need to perform sample-wise block matching operations to identify identical blocks. Collectively, these sample-wise block matching operations can be computationally intensive.

Therefore, in some example implementations, the encoder uses hierarchical hash-based block matching. Hierarchical hash-based block matching can speed up the block matching process and also speed up the process of updating a data structure that organizes candidate blocks.

Hierarchical hash-based block matching uses multiple hash values determined with different hash functions. For a block B (current block or candidate block), in addition to the hash value h(B), the encoder determines another hash value h'(B) using a different hash function h'( ). With the first hash value $h(B_{current})$ for a current block, the encoder identifies candidate blocks that have the same hash value for the first hash function h( ). To further rule out some of these identified candidate blocks, the encoder uses a second hash value $h'(B_{current})$ for the current block, which is determined using a different hash function. The encoder compares the second hash value $h'(B_{current})$ with the second hash values for the previously identified candidate blocks (which have same first hash value), in order to filter out more of the candidate blocks.

In the example of FIG. 12a, if $h(B_{current})=h_3$, the encoder selects the candidate blocks with entry(3, 0), entry (3, 1), entry(3, 2), entry(3, 3), . . . for further refinement. As shown in FIG. 12c, for a candidate block B, an entry includes a block address and a second hash value h'(B) from the hash function h'( ). The encoder compares the second hash value $h'(B_{current})$ for the current block with the second hash values h'(B) for the respective candidate blocks with entry(3, 0), entry (3, 1), entry(3, 2), entry(3, 3), . . . . Based on results of the second hash value comparisons, the encoder can rule out more of the candidate blocks, leaving candidate blocks that have first and second hash values matching $h(B_{current})$ and $h'(B_{current})$, respectively. The encoder can perform sample-wise block matching on the remaining candidate blocks to select a matching block.

FIGS. 14a-14c show another example of hierarchical hash-based block matching that uses a different data structure. The data structure (1400) in FIG. 14a organizes candidate blocks by first hash value from a first hash function h( ) which has n1 possible hash values. The data structure (1400) includes lists for hash values from $h_0 \ldots h_{n1-1}$. In the example, the encoder determines a first hash value $h(B_{current})=h_2$ for the current block, and selects the list for $h_2$ from the structure (1400).

As shown in FIG. 14b, the list (1410) for $h_2$ includes multiple lists that further organize the remaining candidate blocks by second hash value from a second hash function h'( ), which has n2 possible hash values. The list (1410) includes lists for hash values from $h'_0 \ldots h'_{n2-1}$, each including entries with block addresses (e.g., horizontal and vertical coordinates for top left positions of respective candidate blocks), as shown for the entry (1420) in FIG. 14c. In the example, the encoder determines a second hash value $h'(B_{current})=h'_0$ for the current block, and selects the list for $h'_0$ from the list (1410). For the candidate blocks in the list for $h'_0$, the encoder can perform sample-wise block matching to select a matching block.

Aside from hash-based block matching, the second hash function h'( )can be used to simplify the process of updating a data structure that organizes candidate blocks. For example, when the encoder checks whether a new candidate block is identical to a candidate block already represented in the data structure, the encoder can use multiple hash values with different hash functions to filter out non-identical blocks. For remaining candidate blocks, the encoder can perform sample-wise block matching to identify any identical block.

In the preceding examples, the hierarchical hash-based block matching and updating use two different hash functions. Alternatively, the encoder uses three, four or more hash functions to further filter out non-identical blocks, and thereby reduce the number of sample-wise block matching operations.

Alternatively, for a low-complexity encoder, the encoder can skip sample-wise block matching operations when hash values match. For hash functions with a large number of possible hash values, there is a high probability that two blocks are identical if all hash values for the two blocks match. In particular, instead of using sample-wise block matching to confirm that blocks are identical when updating the data structure, the encoder can rely on hash value comparisons to evaluate whether blocks are identical. The encoder removes a candidate block from the data structure (or does not add a new candidate block) if all hash values match for the two blocks, under the assumption that the new candidate block and existing candidate block are identical. If a hash value does not match, the new candidate block is added to the data structure. This may result in the exclusion of some non-identical blocks from the data structure, but sample-wise block matching operations are avoided.

Figure 15A:
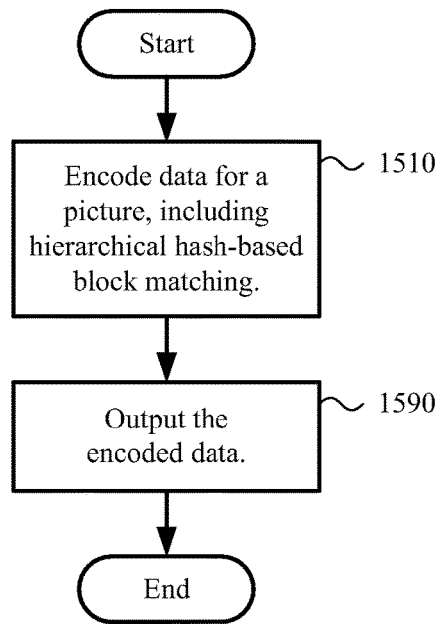
FIGS. 15a and 15b are flowcharts illustrating a technique for encoding that includes hierarchical hash-based block matching.

FIG. 15a shows a generalized technique (1500) for encoding a picture using hierarchical hash-based block matching. An encoder such as one described with reference to FIG. 3 or FIGS. 5a-5b can perform the technique (1500).

The encoder encodes (1510) data for a picture, including hierarchical hash-based block matching. The hierarchical hash-based block matching can be used during BV estimation for intra BC prediction, or the hierarchical hash-based block matching can be used in another context. When it encodes (1510) the data for the picture, the encoder can perform the technique (1511) shown in FIG. 15b. Or, the encoder can perform the encoding (1510) of the data for the picture in some other way.

Figure 15B:
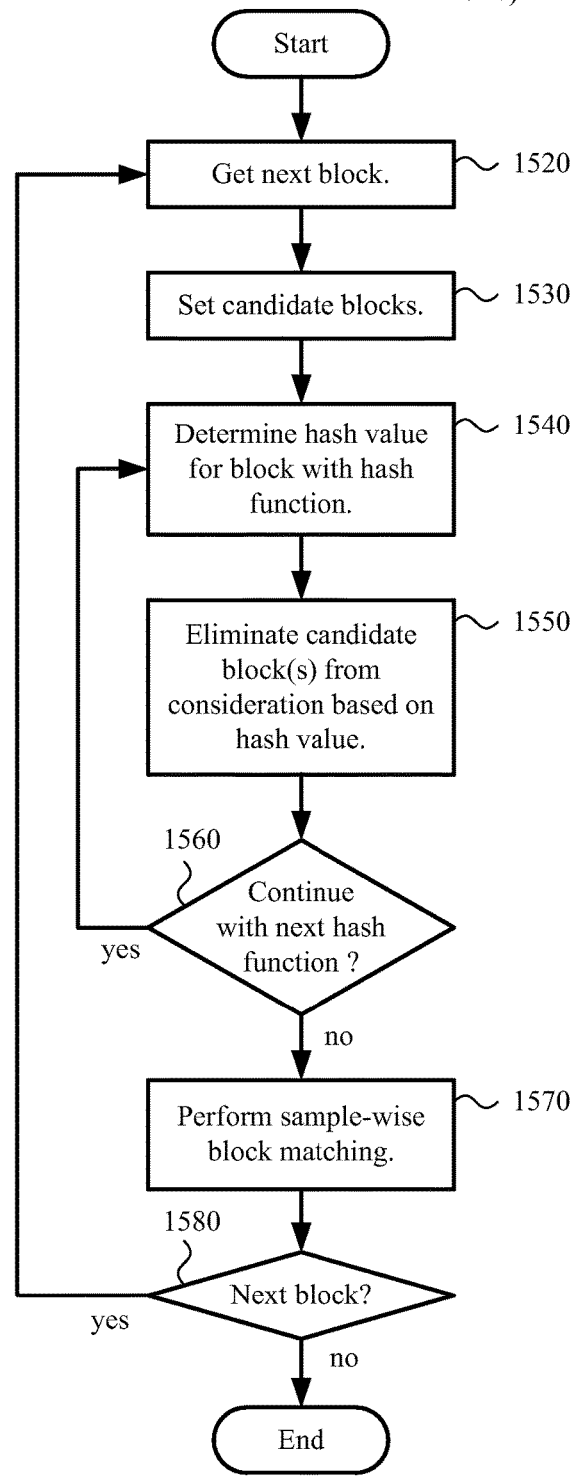

According to the technique (1511) of FIG. 15b, the encoder gets (1520) the next block to be encoded (as the current block). The encoder also sets (1530) candidate blocks to use in the hierarchical hash-based block matching. For example, the encoder creates or updates a data structure that organizes the candidate blocks. For each of the candidate blocks represented in it, the data structure stores multiple hash values, which are determined using different hash functions. A hash function can be a CRC function, locality-sensitive hash function, or other hash function. The hash functions can differ in terms of the type of hash function or number of possible hash values (e.g., 8-bit CRC versus 12-bit CRC).

When two hash values are used per candidate block, the data structure can include one or more lists indexed according to first hash value from a first hash function, where a list includes, for each of the candidate blocks in it, a second hash value from a second hash function. Or, the data structure can organize the candidate blocks according to first hash value from a first hash function and according to second hash value from a second hash function. For example, the data structure includes one or more first candidate block lists indexed according to first hash value from the first hash function, where each first candidate block list includes one or more second candidate block lists indexed according to second hash value from the second hash function, and where each second candidate block list includes information for one or more candidate blocks.

To identify a matching block for the current block, the encoder uses hierarchical hash-based block matching with multiple stages. In each of the multiple stages (iterations), the encoder determines (1540) a hash value for the current block using one of the different hash functions, then eliminates (1550) candidate blocks from consideration based at least in part on the hash value for the current block. The encoder then checks (1560) whether to continue with the next hash function. For example, the encoder continues in the next stage (iteration) if any of the different hash function have not yet been applied and if multiple candidate blocks remain.

After the last hash function has been applied, the encoder can perform (1570) block matching operations between sample values of the current block and any remaining candidate blocks. Thus, the encoder can identify the matching block among the remaining candidate blocks. If none of the remaining candidate blocks qualifies as a matching block, or if no candidate blocks remain after the multiple iterations, the encoder can encode the current block using spatial intra prediction or another form of intra-picture prediction.

The encoder checks (1580) whether to continue with the next block of the picture. If so, the encoder gets (1520) the next block and sets (1530) (updates) the candidate blocks for it.

Returning to FIG. 15a, the encoder outputs (1590) the encoded data. The encoder can repeat the technique (1500) for the next picture.

E. Hash-Based Block Matching Using Input Sample Values.

In some example implementations, the candidate blocks considered in hash-based block matching include reconstructed sample values. That is, the candidate blocks are part of previously encoded then reconstructed content in a picture. Hash values for the candidate blocks are determined from the reconstructed sample values. During hash-based block matching, the encoder determines the hash value for a current block using input sample values. The encoder compares it (or otherwise uses the hash value) against the hash values determined from reconstructed sample values for candidate blocks.

Alternatively, the candidate blocks considered in hash-based block matching include input sample values. That is, the candidate blocks are part of an input version of a picture. Hash values for the candidate blocks are determined from the input sample values. During hash-based block matching, the encoder determines the hash value for a current block using input sample values. The encoder compares it (or otherwise uses the hash value) against the hash values determined from input sample values for candidate blocks. Even so, a matching block from reconstructed sample values is used to represent the current block. Thus, BC prediction operations still use reconstructed sample values.

Figure 16B:
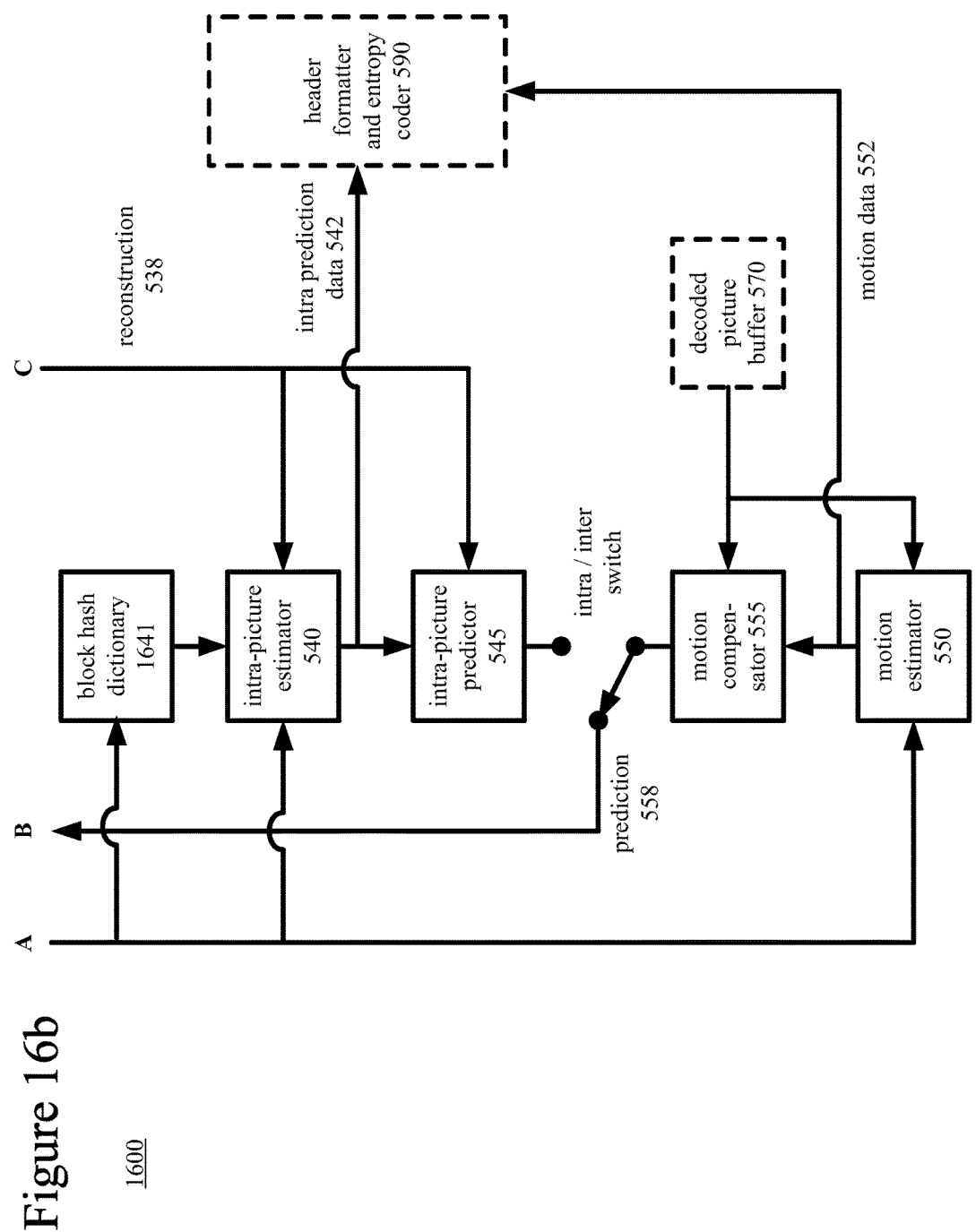

FIGS. 16a and 16b show a generalized video encoder (1600) that determines hash values from input sample values. In most respects, the modules of the encoder (1600) are identical to the modules of the encoder (500) shown in FIGS. 5a and 5b, and the same reference numerals are used in FIGS. 16a and 16b for such modules. The block hash dictionary (1641) is different in FIG. 16b, however. In FIG. 5b, the block hash dictionary (541) stores hash values determined by applying a hash function to reconstructed sample values, and the block hash dictionary (541) is updated using reconstructed sample values. In FIG. 16b, in contrast, the block hash dictionary (1641) stores hash values determined by applying a hash function to input sample values from the input video signal (505), and the block hash dictionary (1641) is updated using input sample values when new candidate blocks become available for use in hash-based block matching.

Using hash values determined from input sample values can improve performance when some blocks are lossy coded. In this case, due to quantization noise, the encoder may be unable to find a matching block that exactly matches the current block if hash values are determined from reconstructed sample values. By determining hash values from input sample values, hash-based block matching is not affected by distortion introduced by lossy coding. The encoder still signals to a decoder which matching block to use for a current block (e.g., using a BV value). Using this information and reconstructed sample values, the decoder reconstructs the current block using a block copy operation.

F. Representing Blocks with Hash Values.

In some example implementations, instead of sending a BV value for the matching block for a current block, an encoder signals the hash value of the matching block that represents the current block. A decoder, using the signaled hash value, reconstructs the current block using its own data structure that organizes candidate blocks according to hash value. In this approach, the decoder creates and updates the data structure that organizes the candidate blocks. Using the signaled hash value for the current block, the decoder finds the appropriate block in the data structure, then uses that block for the current block. In some cases, signaling hash values consumes fewer bits than signaling BV values.

In this approach, the encoder and decoder determine the hash values for the candidate blocks using reconstructed sample values, so the hash values are the same at the encoder and decoder. The organization of the data structure depends on implementation. The encoder can signal multiple hash values per current block, to iteratively filter out non-matching blocks. Or, the encoder can signal a single hash value per current block. Or, in addition to one or more hash values, the encoder can signal an index value that indicates a matching block among multiple remaining candidate blocks.

This approach works well when the hash value(s) signaled for the current block identify, with a high probability, an identical block among the candidate blocks. Performance suffers when the hash value(s) signaled for the current block identify a non-identical matching block among the candidate blocks. In this case, however, the encoder can instead use another form of encoding for the current block (e.g., intra spatial prediction or other intra-picture prediction).

Figure 17A:
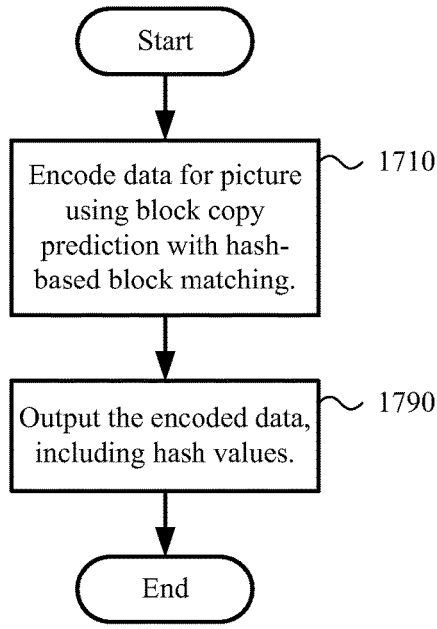
FIGS. 17a and 17b are flowcharts illustrating a technique for encoding of blocks with hash values.

FIG. 17a shows a generalized technique (1700) for encoding a picture using hash values to represent blocks. An encoder such as one described with reference to FIG. 3 or FIGS. 5a-5b can perform the technique (1700).

The encoder encodes (1710) data for a picture, using BC prediction with hash-based block matching. The BC prediction can be intra BC prediction (if the candidate blocks are in the same picture as a current block), or the BC prediction can reference candidate blocks in another picture (in the same video sequence, in another video sequence, or for a sprite or generated reference picture). The candidate blocks are part of a search range, which can include all previously reconstructed content in the picture with the current block (or another picture), or can include a subset of the previously reconstructed content (e.g., reconstructed content in the current CTU and one or more other CTUs in the picture with the current block, or reconstructed content in the same tile as the current block, or reconstructed content in the same slice as the current block). When it encodes (1710) the data for the picture, the encoder can perform the technique (1711) shown in FIG. 17b. Or, the encoder can perform the encoding (1710) of the data for the picture in some other way.

Figure 17B:
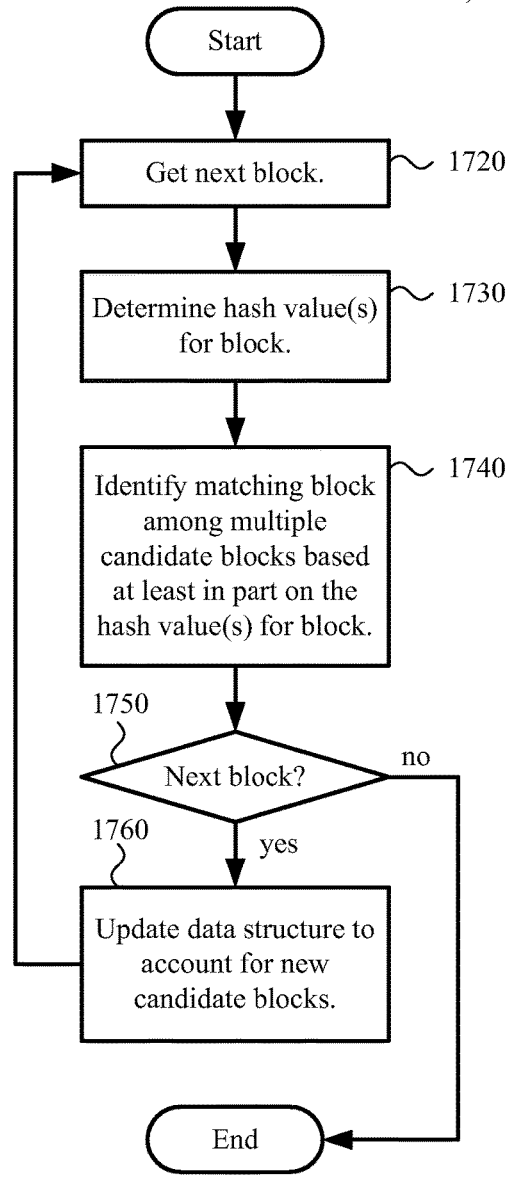

According to the technique (1711) of FIG. 17b, the encoder gets (1720) the next block to be encoded and determines (1730) one or more hash values for that block, as the current block. The hash function can be a CRC function, locality-sensitive hash function, or other hash function.

The encoder identifies (1740) a matching block among multiple candidate blocks based at least in part on the hash value(s) for the current block. For example, for each of one or more of the candidate blocks, the encoder compares the hash value(s) for the current block to the hash value(s) for the candidate block. Or, when a data structure organizes the candidate blocks according to hash value, the encoder uses the hash value(s) for the current block to select a candidate block list, then determines the matching block among any candidate blocks in the selected list (e.g., performing block matching operations between sample values of the current block and a given candidate block).

If hash-based block matching succeeds, the encoder signals the hash value(s) for the matching block that represents the current block. The encoder can also signal the index value for the matching block within a candidate block list, where applicable. The encoder can encode the signaled values, e.g., using CABAC or another form of entropy coding. Otherwise, if hash-based block matching fails, the encoder can encode the current block using spatial intra prediction or another form of intra-picture prediction.

The encoder checks (1750) whether to continue with the next block of the picture. If so, when a data structure organizes candidate blocks according to hash value, the encoder can update (1760) the data structure to account for new candidate blocks that overlap the just-encoded block, then get (1720) the next block and determine (1730) the hash value(s) for it.

Returning to FIG. 17a, the encoder outputs (1790) the encoded data, which includes the signaled hash values. The encoder can repeat the technique (1700) for the next picture.

FIG. 18a shows a generalized technique (1800) for decoding a picture using hash values to represent blocks. A decoder such as one described with reference to FIG. 4 or FIG. 6 can perform the technique (1800).

The decoder receives (1810) encoded data for a picture, where the encoded data includes hash values that represent blocks of the picture. The decoder decodes (1820) data for a picture, using BC prediction with hash-based block reconstruction. The BC prediction can be intra BC prediction (if the candidate blocks are in the same picture as a current block), or the BC prediction can reference candidate blocks in another picture. When it decodes (1820) the data for the picture, the decoder can perform the technique (1821) shown in FIG. 18b. Or, the decoder can perform the decoding (1820) of the data for the picture in some other way.

According to the technique (1821) of FIG. 18b, the decoder gets (1830) data for the next block to be decoded, including signaled hash value(s) for the current block, and possibly including a signaled index value for the current block. The decoder can decode the signaled value(s).

The decoder identifies (1840) a reconstruction block among multiple candidate blocks based at least in part on the hash value(s) signaled for the current block. For example, for each of one or more of the candidate blocks, the decoder compares the hash value(s) for the current block to the hash value(s) for the candidate block to find the reconstruction block. For the hash values of candidate blocks, the hash function can be a CRC function, locality-sensitive hash function, or other hash function. When a data structure organizes the candidate blocks according to hash value, the decoder can use the hash value(s) for the current block to find the reconstruction block in the data structure. Or, the decoder can use the hash value(s) for the current block to find a candidate block list in the data structure, then find the reconstruction block among any candidate blocks in the selected list (e.g., using a signaled index value).

When hash-based block reconstruction is used, the decoder uses (1850) the identified reconstruction block for the current block. Otherwise, if hash-based block reconstruction is not used, the encoder can decode the current block using spatial intra prediction or another form of intra-picture prediction.

The decoder checks (1860) whether to continue with the next block of the picture. If so, when a data structure organizes candidate blocks according to hash value, the decoder can update (1870) the data structure to account for new candidate blocks that overlap the just-decoded block, then get (1820) the hash value(s) for the next block and continue.

The decoder can repeat the technique (1800) for the next picture.

G. Example Hash Functions.

The hash function used for hash-based block matching (and, for section F, hash-based block reconstruction) depends on implementation.

A hash function can produce hash values with 8 bits, 12 bits, 16 bits, 24 bits, 32 bits, or some other number of bits. Generally, using hash values with fewer bits tends to reduce the size of the data structure that organizes candidate blocks, at least when identical blocks are eliminated. If a hash value has fewer bits, the data structure includes fewer categories, but each category may include more candidate blocks. On the other hand, using hash values with more bits tends to increase the size of the data structure that organizes candidate blocks. If a hash value has more bits, the data structure includes more categories, but each category may include fewer candidate blocks.

In some example implementations, the hash function used in hash-based block matching (and hash-based block reconstruction) is a cyclic redundancy check ("CRC") function. CRC functions are fast and widely implemented, since they are commonly used for error checking purposes. A CRC function tends to produce very different hash values when applied to similar input values. That is, changing the sample values of a block slightly can lead to different CRC hash values. A CRC function can produce hash values with 8 bits, 12 bits, 16 bits, 24 bits, 32 bits, or some other number of bits.

When used for hash-based block matching, CRC functions work well to find a matching block that is exactly identical to a current block. A CRC function typically does not help find a matching block that only approximates a current block, however.

In other example implementations, the hash function used in hash-based block matching (and hash-based block reconstruction) uses averaging and XOR operations to determine the signature of a candidate block or current block. A hash value includes a component based on average of the block and one or more components based on directional XOR operations.

For example, for an 8×8 block B[i, j] with 8-bit sample values, the hash value is a 24-bit value with three 8-bit components. The first 8-bit component is the average $\mu$ of the sample values in the block.

$$\mu = \frac{\sum_{0 \leq i < 8, 0 \leq j < 8} B[i, j]}{64}.$$

For the second and third 8-bit components, a level map L[i, j] of sample values is derived using the average value $\mu$ for the block.

$$L[i, j] = \begin{cases} 1, & \text{when } B[i, j] > \mu \\ 0, & \text{otherwise} \end{cases}, 0 \leq i < 8, \text{ and } 0 \leq j < 8.$$

The second 8-bit component r is based on XOR operations along rows of the level map L[i, j]. For each row $0 \leq j < 8$ of the level map L[i, j], a bit r[j] of the second component is determined.

r[j]=L[0,j]⊕L[1,j]⊕L[2,j]⊕L[3,j]⊕L[4,j]⊕L[5,j]⊕L[6,j]⊕L[7,j], where ⊕ represents an XOR operation.

The third 8-bit component c is based on XOR operations along columns of the level map L[i, j]. For each column $0 \leq i < 8$ of the level map L[i, j], a bit c[i] of the third component is determined.

c[i]=L[i, 0]⊕L[i, 1]⊕L[i, 2]⊕L[i, 3]⊕L[i, 4]⊕L[i, 5]⊕L[i, 6]⊕L[i, 7].

Thus, for the second component r, the $j^{th}$ bit is the XOR of the $j^{th}$ row's level map. And, for the third component c, the $i^{th}$ bit is the XOR of the $i^{th}$ column's level map. The 24-bit hash value is ($\mu$<<16)+(r<<8)+c, where << represents a left shift operation.

For this hash function, the second and third components (based on XOR operations) are sensitive to small variations in sample values. When used for hash-based block matching, hash functions based on averaging and XOR operations work well to find a matching block that is exactly identical to a current block, however.

Instead of 8×8 blocks, a hash function that uses averaging and XOR operations can be used for a different size of block, e.g., computing XOR operations along pairs of rows or pairs of columns for a 16×16 block to determine an 8-bit component r or c, computing XOR operations along groups of four rows or four columns for a 32×32 block to determine an 8-bit component r or c, and so on. Alternatively, a hash function that uses averaging and XOR operations can produce hash values with a different number of bits.

In other example implementations, the hash function used in hash-based block matching (and hash-based block reconstruction) is a locality-sensitive hash function. A locality-sensitive hash function tends to produce the same hash value when applied to similar input values. That is, changing the sample values of a block slightly typically does not lead to different hash values. A locality-sensitive hash function can produce hash values with 8 bits, 12 bits, 16 bits, 24 bits, 32 bits, or some other number of bits.

For example, for an 8×8 block B, a 64-dimension vector $\vec{b}$ is generated from the 64 sample values of the block B. Another 64-dimension vector $\vec{v}$ is randomly generated. The hash function depends on the product $\vec{b} \cdot \vec{v}$. For example, the hash function can be $$h(\vec{b}) = \left\lfloor \frac{\vec{v} \cdot \vec{b} + d}{d_{range}} \right\rfloor,$$

where d is a real number chosen from the range $0 \ldots d_{range}$. If two blocks are similar, then their vectors $\vec{b}_1$ and $\vec{b}_2$ are similar, and their hash values $h(\vec{b}_1)$ and $h(\vec{b}_2)$ should also be the same or similar.

In some example implementations, the hash function used in hash-based block matching (and hash-based block reconstruction) includes block width and block height as input. For example, the hash function can be a modified CRC function, modified hash function that uses averaging and XOR operations, or modified locality-sensitive hash function, for which the hash value depends in part on block height and block width as inputs. With this variation of hash function, candidate blocks of different sizes (such as 64×64, 32×32, 16×16 and 8×8) are grouped together if they have the same hash value, and candidate blocks of different sizes can be organized within a single data structure.

Alternatively, another hash function is used for hash-based block matching.

H. Intra BC Prediction Mode—Implementation Options.

A block with prediction mode of intra BC prediction can be a CB, PB or other block. When the block is a CB, the BV value for the block can be signaled at CU level (and other CBs in the CU use the same BV value or a scaled version thereof). Or, when the block is a PB, the BV value for the block can be signaled at PU level (and other PBs in the PU use the same BV value or a scaled version thereof). More generally, the BV value for an intra-BC prediction block is signaled at an appropriate syntax level for the block.

The block copying operations of prediction according to the intra BC prediction mode can be performed at the level of CB (when a BV value is signaled per CB) or PB (when a BV value is signaled per PB). For example, suppose a 16×16 CB has a single 16×16 PB. The BV value (for the PB) is applied to block copy a 16×16 region. Alternatively, the block copying operations can be performed at the level of TBs within a PB or CB, even when the BV value is signaled for the PB or CB. In this way, a BV value, as applied for a TB, can reference positions of other TBs in the same PB or CB.

In some implementations, for an intra BC predicted CU, intra BC prediction for a chroma block in a PU uses the same BV value as intra BC prediction for the luma block in the PU, possibly after scaling and rounding when the chroma data has reduced resolution relative to the luma data (e.g. when the format is YUV 4:2:0 format). Alternatively, different BV values can be signaled for the luma block and chroma blocks of a PU.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing device comprising one or more processing units and memory, wherein the computing device implements an encoder of video or images, the encoder being configured to perform operations comprising:
   encoding data for a current block of a picture using hierarchical hash-based block matching with multiple stages, including:
      determining a first hash value for the current block using a first hash function;
      determining a second hash value for the current block using a second hash function different than the first hash function;
      identifying a matching block among multiple candidate blocks based at least in part on the first hash value for the current block and the second hash value for the current block, including using the first hash value for the current block to select a candidate block list in a data structure that organizes hash values for the multiple candidate blocks, thereby eliminating at least one of the multiple candidate blocks in one of the multiple stages of the hierarchical hash-based block matching, and, based at least in part on the second hash value for the current block, determining the matching block among any candidate blocks in the selected candidate block list, thereby eliminating at least one of the multiple candidate blocks in a next stage of the multiple stages of the hierarchical hash-based block matching; and
      identifying a block vector value for the matching block, the block vector value indicating a displacement to a region of sample values used for block copy prediction; and
   outputting the encoded data, wherein the encoded data includes the block vector value.

2. The computing device of claim 1 wherein the encoding for the current block further comprises encoding the block vector value and performing the block copy prediction for the current block using the block vector value.

3. The computing device of claim 1 wherein the first hash function is one of a cyclic redundancy check function, a hash function that includes averaging and XOR operations, and a locality-sensitive hash function.

4. The computing device of claim 1 wherein the picture that includes the current block also includes the multiple candidate blocks, and wherein, for the block copy prediction, the encoding data for the current block uses intra block copy prediction.

5. The computing device of claim 1 wherein another picture includes at least some of the multiple candidate blocks, and wherein the block copy prediction references the other picture.

6. The computing device of claim 1 wherein the encoding data for the current block includes, for each of one or more of the multiple candidate blocks in the selected candidate block list, comparing the second hash value for the current block to a second hash value for the candidate block.

7. The computing device of claim 1 wherein the operations further comprise updating the data structure to account for new candidate blocks that overlap the current block, including, for each of the new candidate blocks:
   determining a first hash value and a second hash value for the new candidate block;
   evaluating whether the new candidate block is identical to any candidate block already represented in the data structure;
   if so, keeping the new candidate block or the identical block in the data structure; and
   if not, adding the new candidate block to the data structure.

8. The computing device of claim 1 wherein, for each of the multiple candidate blocks, a first hash value and a second hash value for the candidate block are determined from input sample values of a picture that includes the candidate block, and wherein the first hash value and the second hash value for the current block are determined from input sample values of the current block.

9. In a computing device with a video encoder or image encoder, a method comprising:
   creating a data structure that organizes multiple candidate blocks, each of the multiple candidate blocks having a first hash value from a first hash function and a second hash value from a second hash function different than the first hash function;
   encoding data for a current block of a picture, including using the data structure in hierarchical hash-based block matching for block vector estimation by eliminating, in each of multiple stages, at least one of the multiple candidate blocks, the block vector estimation identifying a block vector value that indicates a displacement to a region of sample values used for block copy prediction, wherein the encoding the data for the current block includes:
      determining a first hash value for the current block using the first hash function;
      determining a second hash value for the current block using the second hash function:
      using the first hash value for the current block to select a candidate block list in the data structure; and
      based at least in part on the second hash value for the current block, determining a matching block among any candidate blocks in the selected candidate block list; and
   outputting the encoded data for the picture.

10. The method of claim 9 further comprising updating the data structure to account for new candidate blocks that overlap the current block, including, for each of the new candidate blocks:
   determining a first hash value and a second hash value for the new candidate block;
   evaluating whether the new candidate block is identical to any candidate block already represented in the data structure;
   if so, keeping the new candidate block or the identical block in the data structure; and
   if not, adding the new candidate block to the data structure.

11. The method of claim 9 wherein the picture that includes the current block also includes the multiple candidate blocks, and wherein, for the block copy prediction, the encoding data for the current block uses intra block copy prediction.

12. One or more computer-readable memory or storage devices storing computer-executable instructions for causing a computing device, when programmed thereby, to perform operations comprising:
   encoding data for a current block of a picture, wherein the encoding includes hierarchical hash-based block matching for block vector estimation, the block vector estimation identifying a block vector value that indicates a displacement to a region of sample values used for block copy prediction, wherein the hierarchical hash-based block matching for the current block includes identifying a matching block among multiple candidate blocks by:

determining a first hash value for the current block using a first hash function;

determining a second hash value for the current block using a second hash function different than the first hash function;

using the first hash value for the current block to select a candidate block list in a data structure, thereby eliminating at least one of the multiple candidate blocks from consideration based at least in part on the first hash value for the current block; and based at least in part on the second hash value for the current block, determining a matching block among any candidate blocks in the selected candidate block list; and outputting the encoded data for the picture.

13. The one or more computer-readable memory or storage devices of claim 12 wherein the first hash function is one of a cyclic redundancy check function, a hash function that includes averaging and XOR operations, and a locality-sensitive hash function.

14. The one or more computer-readable memory or storage devices of claim 12 wherein the identifying the matching block for the current block further includes performing block matching operations between sample values of the current block and a remaining candidate block.

15. The one or more computer-readable memory or storage devices of claim 12 wherein the picture that includes the current block also includes the multiple candidate blocks, and wherein, for the block copy prediction, the encoding data for the current block uses intra block copy prediction.

16. The one or more computer-readable memory or storage devices of claim 12 wherein the data structure includes one or more candidate block lists indexed according to first hash value from the first hash function, wherein each of the one or more candidate block lists includes (a) one or more candidate block lists indexed according to second hash value from the second hash function or (b) for each of one or more of the multiple candidate blocks, a second hash value from the second hash function for the candidate block.

17. The method of claim 9 wherein the first hash function is one of a cyclic redundancy check function, a hash function that includes averaging and XOR operations, and a locality-sensitive hash function.

18. The method of claim 9 wherein the data structure includes one or more candidate block lists indexed according to first hash value from the first hash function, wherein each of the one or more candidate block lists includes (a) one or more candidate block lists indexed according to second hash value from the second hash function or (b) for each of one or more of the multiple candidate blocks, a second hash value from the second hash function for the candidate block.

19. The one or more computer-readable memory or storage devices of claim 12 wherein another picture includes at least some of the multiple candidate blocks, and wherein the block copy prediction references the other picture.

20. The computing device of claim 1 wherein the data structure includes one or more candidate block lists indexed according to first hash value from the first hash function, and wherein each of the one or more candidate block lists includes (a) one or more candidate block lists indexed according to second hash value from the second hash function or (b) for each of one or more of the multiple candidate blocks, a second hash value from the second hash function for the candidate block.

* * * * *